US005480155A

United States Patent [19]
Molitor et al.

[11] Patent Number: 5,480,155
[45] Date of Patent: * Jan. 2, 1996

[54] GOLF BALL

[75] Inventors: Robert P. Molitor, Niles, Mich.; Terence Melvin, Somers, Conn.

[73] Assignee: Lisco, Inc., Tampa, Fla.

[*] Notice: The portion of the term of this patent subsequent to Sep. 29, 2009, has been disclaimed.

[21] Appl. No.: 162,215

[22] Filed: Dec. 2, 1993

Related U.S. Application Data

[60] Continuation-in-part of Ser. No. 887,727, May 22, 1992, abandoned, which is a division of Ser. No. 321,689, Mar. 10, 1989, Pat. No. 5,150,906.

[51] Int. Cl.$^6$ .............................. A63B 37/08; B23P 25/00
[52] U.S. Cl. ..................... 273/220; 273/235 R; 273/231; 273/DIG. 22; 273/58 H; 29/530; 29/899; 264/4; 264/248; 264/310; 156/97; 156/145
[58] Field of Search ...................................... 273/215, 220, 273/235 R, 231, DIG. 8, 218, 58 H, 62, 219; 29/530, 899, 899.1; 156/145, 445, 97; 264/4, 248, 310

[56] References Cited

U.S. PATENT DOCUMENTS

| | | | |
|---|---|---|---|
| 699,813 | 5/1902 | Richards | 273/215 |
| 5,150,906 | 9/1992 | Molitor et al. | 273/220 |

*Primary Examiner*—George J. Marlo

[57] ABSTRACT

An improved golf ball comprising a hollow, spherical shell of a polymeric material; a unitary, noncellular core of a material which, at the time of introduction into the shell, is a liquid and a one-piece spherical cover over the center. The spherical shell, as opposed to the core, is primarily responsible for the high initial velocity obtained when the golf ball is struck by a golf club so as to allow the golf ball to be driven long distances both in the air and on the ground when it lands. In an alternate embodiment, the center and cover are of a one-piece, blow-molded construction.

17 Claims, 17 Drawing Sheets

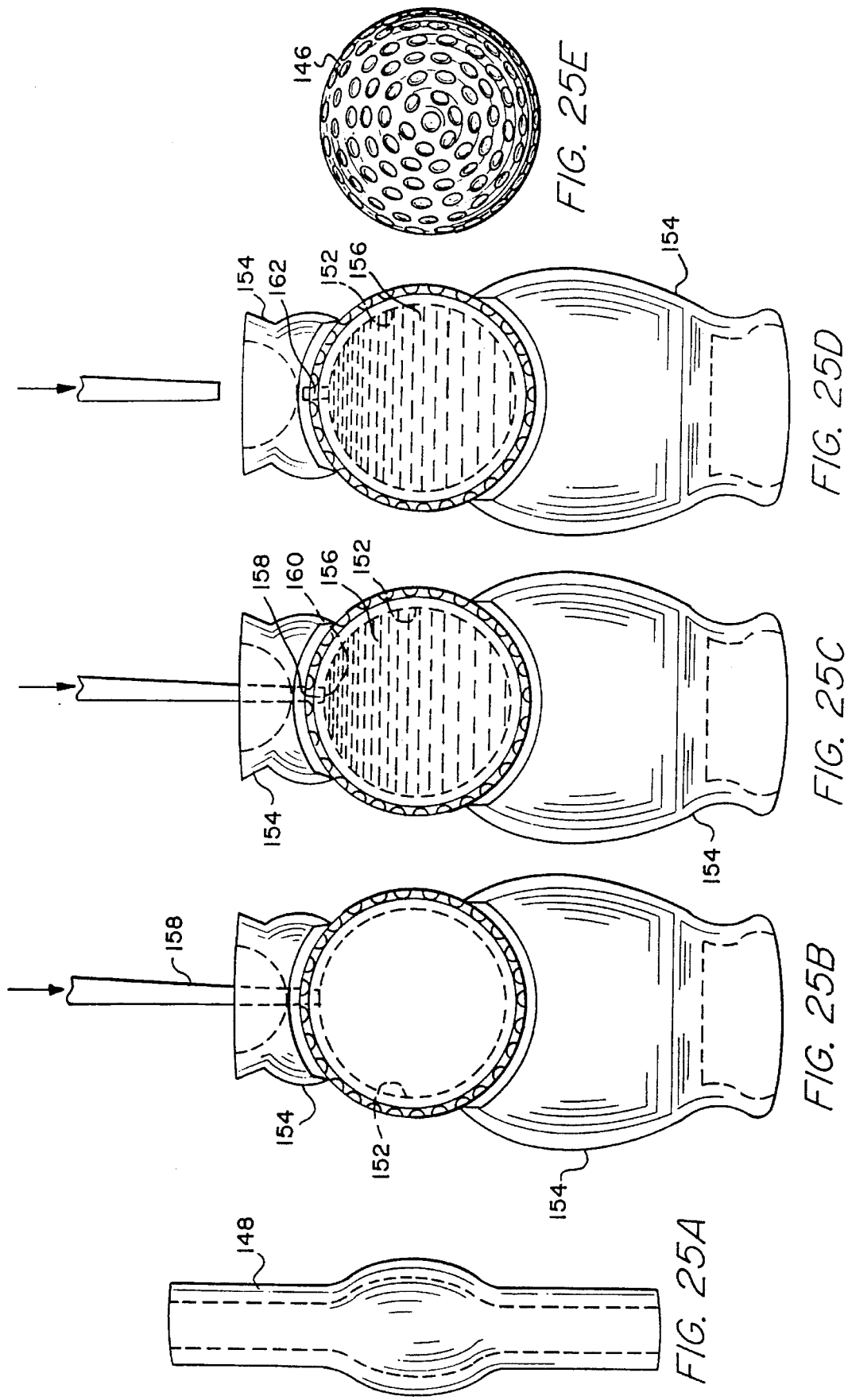

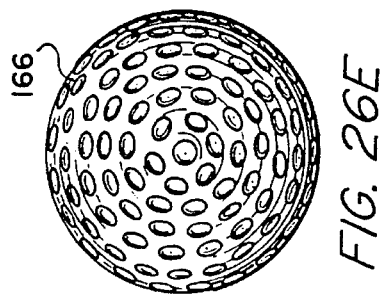
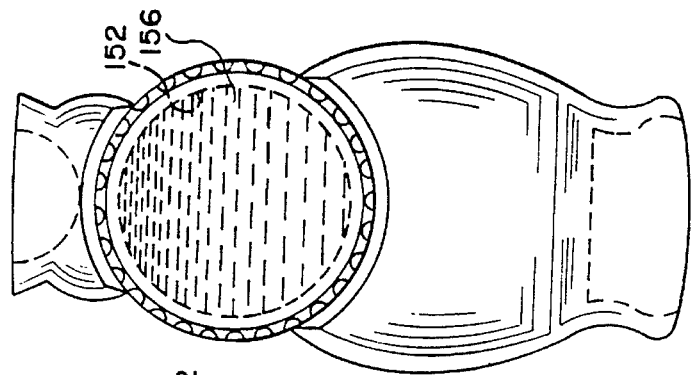
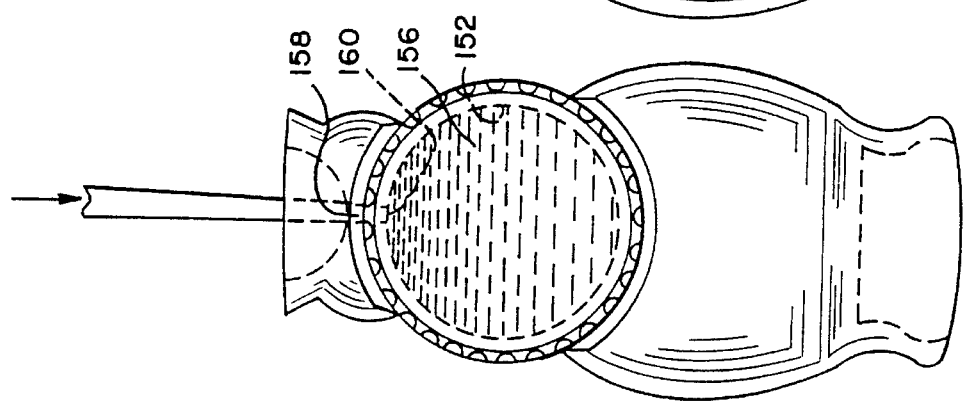
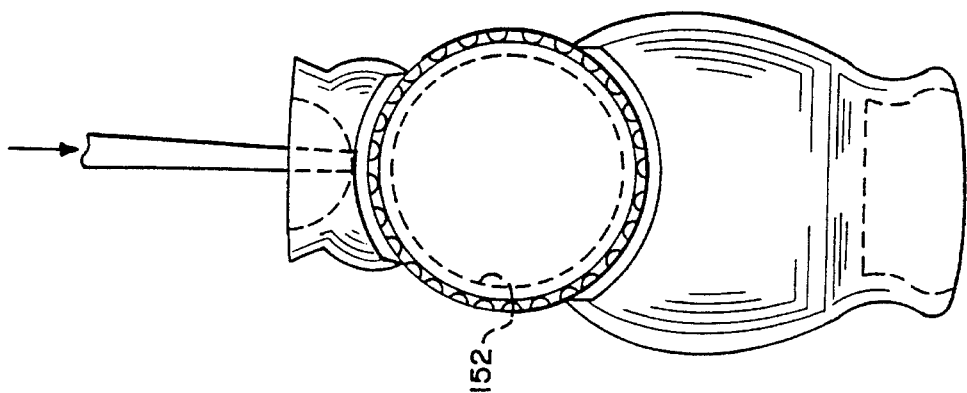
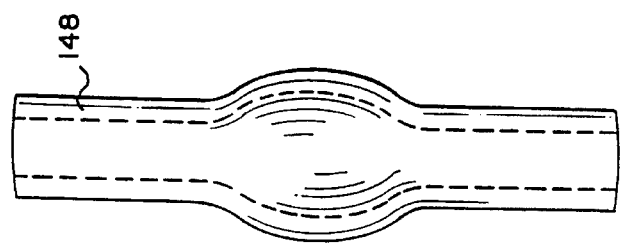

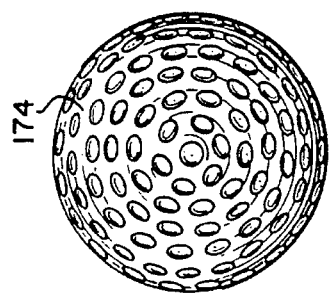
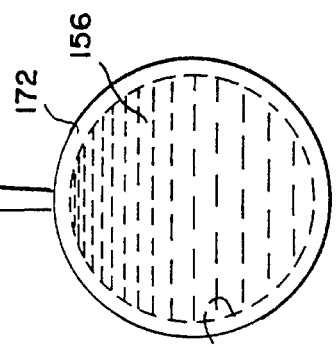
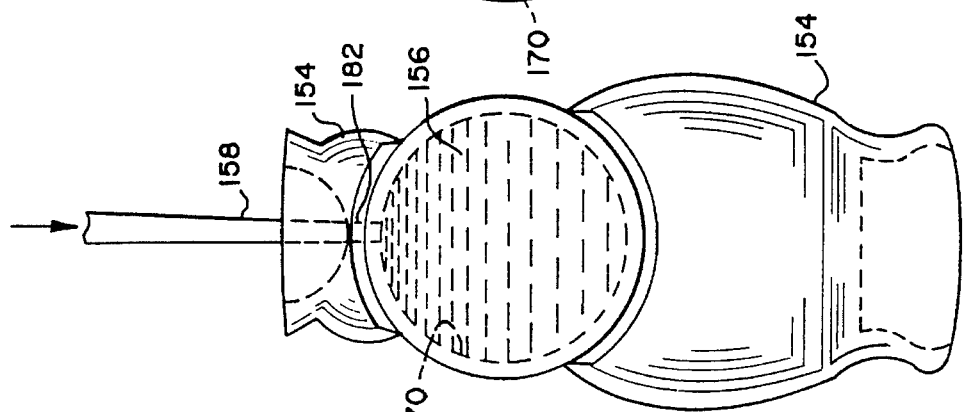
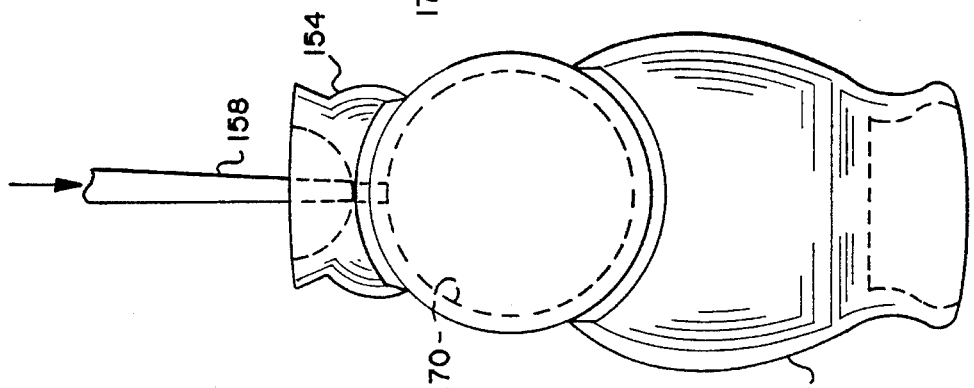
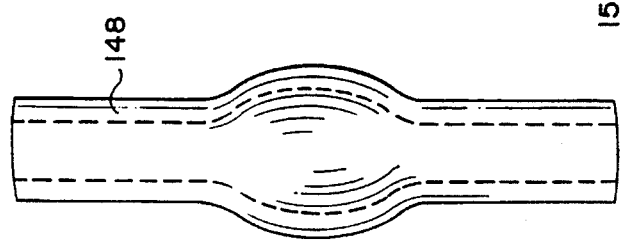

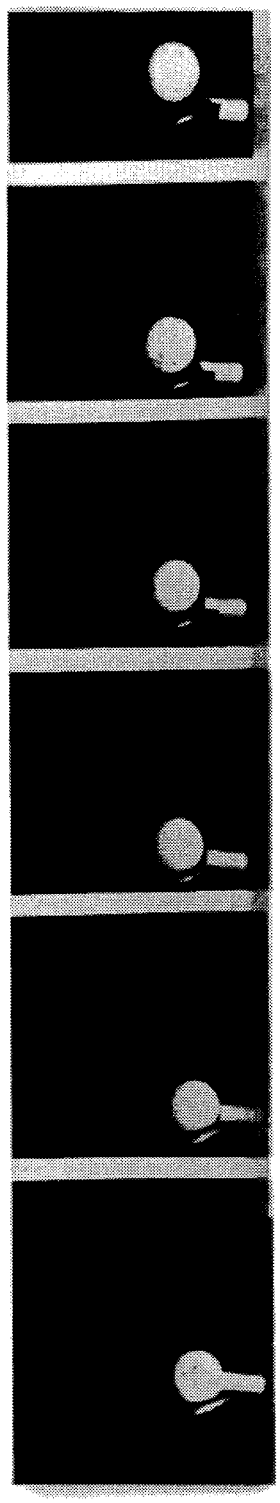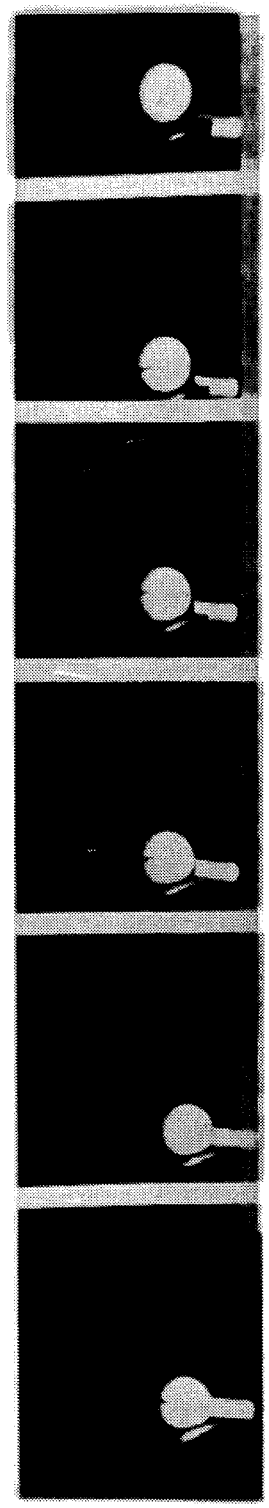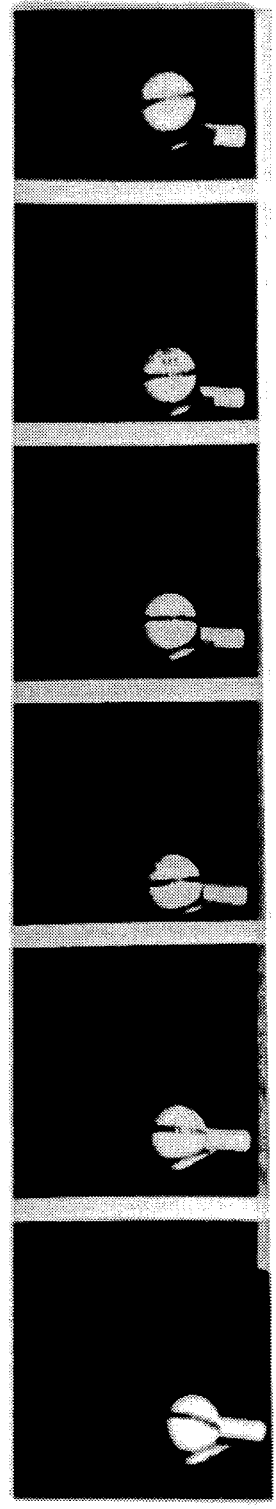

TF II

UNIQUE

DT

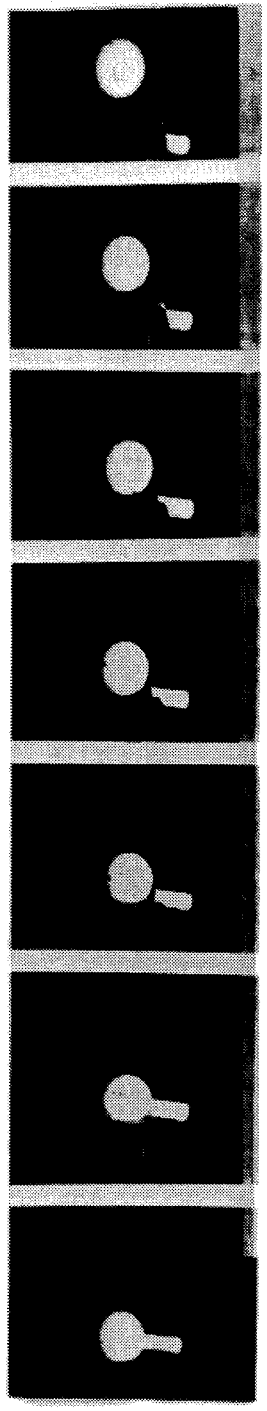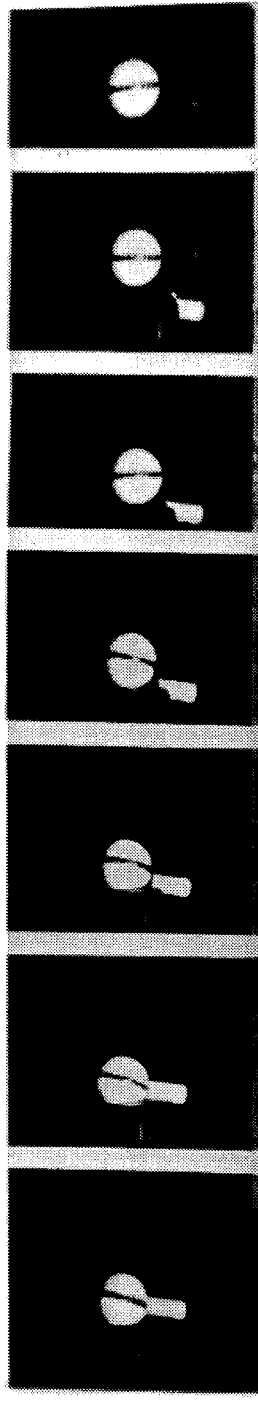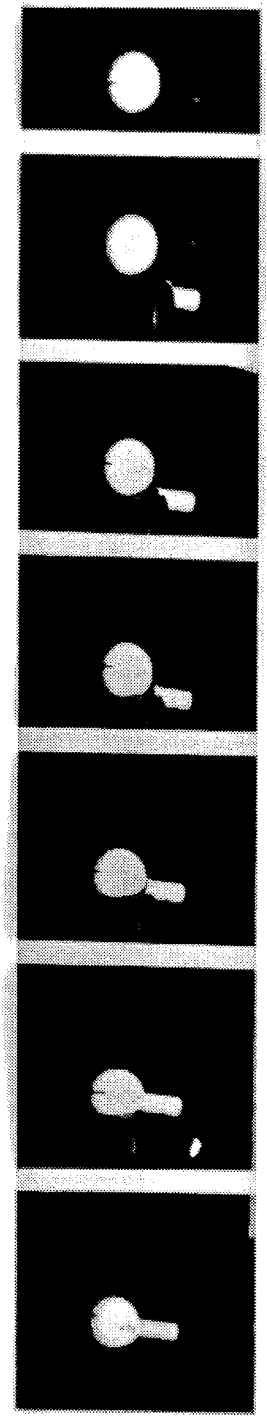

GOLF BALL

RELATED APPLICATIONS

This application is a continuation-in-part of U.S. patent application Ser. No. 07/887,727, filed May 22, 1992, now abandoned which in turn is a division of U.S. patent application Ser. No. 07/321,689, filed Mar. 10, 1989, now U.S. Pat. No. 5,150,906, issued Sep. 29, 1992.

TECHNICAL FIELD

This invention relates to golf balls and to methods of manufacturing golf balls. More particularly, this invention relates: to multi-piece type golf balls where the golf balls have a high coefficient of restitution, conform to the initial velocity requirements of the United States Golf Association ("U.S.G.A.") and may, in regulation play, be driven long distances, in terms of carry and roll; and to methods of manufacturing such golf balls at a reduced cost.

BACKGROUND OF THE INVENTION

Conventional golf balls are of two general types, solid one-piece balls and multi-piece balls. Solid one piece balls consist of a polymeric sphere having a plurality of dimples molded on its outer surface to aid the flight characteristic of the ball. Multi-piece balls consist of either three piece, thread wound balls or two piece balls having a preformed core covered with a separate and distinct cover.

Over sixty years ago, a natural resin, balata, came into widespread usage as a golf ball cover material for multi-piece balls. The recognized advantages of using balata are that it gives the ball a good "feel" when the ball is struck and that "good" golfers are more easily able to control the flight of the ball to their satisfaction. Significant, recognized disadvantages are that a balata cover "cuts" easily, particularly when the ball is miss-hit and that the balata cover reduces the initial velocity or coefficient of restitution when used with a given center. Nowadays, balata covered balls—almost exclusively three-piece balls—have limited market appeal and are generally used only by pro or expert golfers who are primarily interested in controlling the ball.

During the past twenty years or so, synthetic polymeric materials, and mixtures such materials of, have come into widespread use for multi-piece golf ball covers. Such polymeric ball covers are relatively cut-proof when compared to balata covered balls due to the superior toughness of the polymeric materials vis-a-vis the relatively weaker balata. Additionally, they enhance the performance of the balls, whatever the ball's center may be. Largely because of their durability, polymeric covered balls have gained popularity with "average" golfers, and their sales greatly exceed those of balata covered balls. Nevertheless, many existing polymeric covered balls have had difficulty giving the same "feel" and being as "controllable" as balata covered balls. While softer ionomers and the like have been used to enhance the feel of the polymeric covers, on impact, however, they still do not closely approach the feel and distortion of balata covered thread wound golf balls. Achieving this desired "feel" and controllability—while maintaining desired distance characteristics—has long been and remains an important objective of manufacturers of polymeric covered balls.

Another important factor in the marketing of golf balls is the long-held belief that balls which can be driven farther, in terms of carry and roll, are better. Having the longest ball—compatible with the U.S.G.A. requirements—has been and also remains another, longstanding objective of golf ball manufacturers. In this respect, prior balata and polymeric covered balls, and certainly those intended for U.S.G.A. regulation play, have shared one thing in common. They have all relied on their preformed cores as the primary vehicle for transferring energy from the golf club to the ball when the ball is struck by the club. For years, the principle thrust of golf ball research and development has been directed to making improved preformed cores for enhancing distance performance. In other words, conventional wisdom among golf ball manufacturers has been that enhanced distance performance is primarily achievable through the use of better energy transferring cores.

This is not to say that some did not recognize that the cover composition could contribute to the ball's distance performance. U.S. Pat. No. 3,819,768, which issued in the name of Robert P. Molitor (one of the named inventors herein) and which disclosed the use of mixed "SURLYN" resins as a ball cover material, recognized that the use of a mixed "SURLYN" cover could and did increase the distance the ball could be driven. Nevertheless, the cores of the balls manufactured under U.S. Pat. No. 3,819,789 still were preformed and were believed to be a significant contributor to energy transfer. The coefficient of restitution of these cores was approximately 0.750 and the final ball was approximately 0.780.

The approach of utilizing preformed cores as the principal "mechanism" for transferring energy has recognized disadvantages. The cost of manufacturing such preformed cores is a relatively large part of the cost of manufacturing the golf balls. Because of the relative complex technology and operations involved, the use of such preformed cores have also imposed added quality assurance problems and costs.

In summary, those working in the golf ball art have long sought to develop a golf ball that: has the "feel" and controllability of a balata covered three-piece ball; has a high initial velocity or initial coefficient of restitution, has a good "cut resistant" and durable cover; may be driven long distances in regulation play, hopefully by "average" golfers; and, importantly, may be uniformly and inexpensively manufactured by mass production techniques. As noted, to a large extent, the industry has sought to achieve this long recognized and desired objective by using a polymer or balata cover over a preformed core and by enhancing the ball's preformed core's capacity for transferring energy when the ball is struck by a golf club.

SUMMARY OF THE INVENTION

The present invention is truly a unique breakthrough in the construction and manufacture of multi-piece golf balls intended for regulation play under U.S.G.A. requirements. Multi-piece golf balls, according to the present invention, represent a completely novel approach as to how a commercial viable golf ball should be constructed and manufactured.

More specifically, the approach of the present invention is directly contrary to the longstanding, prevailing industry thinking. A preformed spherical shell, rather than a preformed core, is the starting point for the golf ball, and the materials selected for the spherical shell may provide substantially all of the energy transfer contribution to the performance of the golf ball. In other words, the unique golf ball of the present invention (hereinafter sometimes the "Unique ball") relies primarily on the shell composition for transferring energy from the golf club to the ball when the ball is struck, and its core need not contribute anything to this energy transfer. Rather, the core's principal contribution is to give the ball the weight desired or needed to conform to U.S.G.A. rules.

The golf ball of the present invention not only has a unique construction but also enjoys significant advantages over conventional multi-piece balls. With respect to three-piece balls, the golf ball of the present invention has all the advantages that a conventional two-piece ball affords. With respect to two-piece balls, the Unique ball enjoys the following advantages:

(1) The Unique ball distorts more and remains longer on the face of a golf club in a manner similar to balata covered, thread wound three-piece balls. This provides a "feel" and controllability very comparable to balata covered balls.

(2) The Unique ball has a significantly lower trajectory with long distance golf clubs (e.g. drivers) than conventional two-piece or three-piece balls made today. Skilled golfers, based on their choice of clubs and how the club head approaches the ball, can also easily and readily modify the trajectory of the present ball.

(3) The Unique ball can be driven farther (carry plus roll) than conventional two-piece and three-piece balls. Initial testing has shown that as the loft angle of long distance clubs increase, this increase in distance becomes more and more noticeable and that the roll of this Unique ball may approach twice that of a conventional two-piece ball. For instance, initial testing has also indicated that a golf ball, made in accordance with the present invention and having a coefficient of restitution of 0.745 to 0.765, may be driven farther than a conventional two-piece ball having a coefficient of restitution of 0.815. It is believed that less energy is lost because of the deformation and restoration of the Unique ball when it is struck by a club. Striking the ball deforms the cover and also the pre-formed core. This core deformation uses or wastes energy that does not occur with the Unique ball when using a liquid core. Further in the case of the Unique ball, the liquid core need not be put into rotation as is necessary in the case of conventional golf balls, thereby further conserving energy. Additionally, because of the lower trajectory of the ball, the ball will land at a more acute angle to the ground and this, too, lessens the energy expended on landing. Further, it is believed that some increase in distance is due to the lower spin rate of the Unique golf ball in flight, resulting in a significant increase in roll.

(4) The Unique ball's increase in driving distance is surprisingly more noticeable with golfers who swing their club heads at speeds of 145 feet per second (f.p.s.) or below (that is, "average" or below average golfers). This will make the Unique ball especially attractive, from a commercial standpoint, since most golfers fall into these categories. In addition, the better golfers will not be penalized.

(5) The Unique balls will be less expensive to manufacture. An obvious cost savings will occur because of the elimination of the cost of manufacturing relatively expensive preformed cores. Other savings will arise in the quality assurance area. For example, a greater tolerance in the degree of non-uniformity in the thickness of the walls of the spherical shell will be permitted due to the fact that the specific gravity of the shell walls will be significantly lower than the specific gravity of the core. Thus the heavier core will compensate for non-uniformity and permit shell wall thickness tolerances of ±0.010, which tolerances are readily obtainable, for example, using conventional blow molding techniques.

The present invention may, as noted, be embodied in golf balls that conform to the initial velocity requirements of the U.S.G.A. and that may, in regulation play, be driven long distances, in terms of carry and roll. Such balls include those disclosed in U.S. Pat. No. 5,273,287 and U.S. patent application Ser. No. 08/808,118 filed on Jan. 25, 1993.

The present invention also encompasses a number of methods of manufacturing or fabricating the Unique golf ball. One such method includes the steps of blow molding a hollow spherical shell or center from a parison of formable polymeric material, and filling the center of the shell with a core material which is a liquid (or at the time of filling, can be handled as a liquid). Another method includes the steps of forming a hollow spherical shell from two hemispherical molded halves and introducing the liquid core material into the shell or center. In the latter golf ball manufacturing or fabrication method, the two hemispherical molded halves may be coupled together by a process selected from a group comprising spin welding, sonic welding, solvent welding, compression molding and adhesive bonding. The latter manufacturing or fabrication method also includes the introduction of the core material into the shell through a pre-drilled or preformed hole or holes and then plugging the hole or holes after the introduction of the core material.

In the contemplated methods, the exterior surface of the shell may constitute the outer surface of the ball's cover and conventional dimples may be formed thereon. Alternatively and preferably, another layer of cover material may be bonded to the outer surface of the shell and this outer layer functions as the ball's cover. (In this latter situation, the shell may also be referred to as a "center", but the term "shell" (as used herein and unless otherwise indicated) is generic to both situations—this is, where the shell serves as the outer part of the ball or where an additional overlayer is used as the outer cover of the ball.)

In the practice of these methods, the core material forms a homogeneous core that substantially fills the shell. The structural characteristics of the shell and core, made according to the contemplated methods, are such that the resulting golf ball has a high co-efficient of restitution, conforms to the initial velocity requirements of the U.S.G.A., and may be driven long distances in regulation play.

Accordingly, it is a primary object of the present invention to provide unique golf balls and methods of manufacturing such golf balls that overcome the inadequacies of the prior golf balls and that represent significant contributions to the golf ball art.

Another object of the invention is to provide a unique golf ball where the ball has a high coefficient of restitution, conforms to the initial velocity requirements of the U.S.G.A. and may, in regulation play, may be driven long distances, in terms of carry and roll, as a result of being struck by a golf club; where the ball comprises a spherical shell and a core material that substantially fills the spherical shell; and where the spherical shell transmits substantially all of the energy from the golf club to the ball when the golf ball is struck by the club. A related object of the present invention is to provide a unique golf ball, of the type described, where the core material contributes to the overall weight of the golf ball, but contributes substantially nothing to the transfer of energy when the golf ball is struck by the golf club.

Still another object of the present invention is to provide a uniquely constructed golf ball, of the type described, having a hollow, spherical shell of a deformable polymeric material and a unitary core of a material, which at the time of introduction into the shell, is a liquid or can be handled as a liquid and which forms a substantially homogeneous core substantially filling the hollow spherical shell; and where the outer surface of the shell preferably includes an outer, spherical layer of polymeric material which serves as the outer cover of the golf ball and which may or may not be the same as that used for the rest of the shell. A related object of the present invention is to provide such a golf ball where the thickness of the shell material is between about 0.060 inches and about 0.410 inches; where the shell is formed from a polymeric material selected from the group consisting of polyurethane resins, polyolefin resins or preferably ionic co-polymers; where the core material is a member selected from a group consisting of a gel, a melt or preferably, a liquid; and where the polymeric material of the shell may be cellular and/or may comprise multiple layers.

Yet another object of the present invention is to make or fabricate a golf ball by preforming a hollow preformed shell in configuration of a sphere from a deformable polymeric material and by introducing into a shell a liquid core material which forms a homogenous core and which substantially fills the shell. A related object of the present invention is to preform the shell either by bonding together two hemispherical molded halves or preferably, by use of blow molding techniques. A further related object of the present invention is to reduce the cost of manufacturing multi-piece golf balls by injecting liquid core material into a preformed or forming spherical shell. A still further related object of this invention is to form a separate cover over and around the spherical shell containing the core material.

Lastly, it is still another object of the present invention to maintain or improve the performance of golf balls which have novel designs and which allow for the reduction in the cost of materials and simplification of the manufacturing steps by utilizing a preformed shell, rather than a preform core, as a starting point for the manufacture of the golf ball.

The foregoing has outlined, rather broadly, the more pertinent and important objects, advantages and features of the present invention so that the following detailed description of the invention may be better understood and so that the present significant contributions to the art may be more fully appreciated. Additional objects, advantages and features of the invention will be described hereinafter. It should be appreciated by those skilled in the golf ball art that the disclosed specific embodiments of the present invention may be readily utilized as a basis for modifying or designing other golf ball constructions or manufacturing methods for carrying out the purposes of the present invention.

DESCRIPTION OF THE DRAWINGS

For a fuller understanding of the objects, advantages and features of the present invention, reference should be made to the following detailed description of the preferred embodiments, taken in conjunction with the accompanying drawings in which:

FIGS. 25A through 25E, 26A through 26E, 27A through 27E, 28A through 28E, 29A through 29E, and 30A through 30E illustrate steps utilized in the manufacture or fabrication of the various embodiments of the present invention, with each of FIGS. 25E, 26E, 27E, 29E and 30E being an elevational view showing a golf ball made in accordance with the process illustrated in FIGS. 25A through 25D, 26A through 26D, 27A through 27D, 28A through 28D, 29A through 29D, and 30A through 30D, respectively; and FIGS. 31A through 31F, 32A through 32F, and 33A through 33F, 34A through 34F, 35A through 35F, 36A through 36E, 37A through 37G, 38A through 38G, and 39A through 39G illustrate the performance of golf balls fabricated in accordance with the principles of the present invention in comparison with the performance of conventional golf balls.

It should be noted that the same or similar reference characters or numbers may be used to refer to similar parts throughout the several FIGURES.

DESCRIPTION OF THE PREFERRED EMBODIMENTS

An Overview

Figure 1:
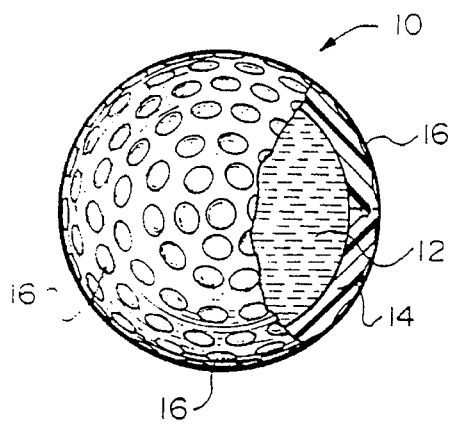
FIG. 1 is an elevational view, partly in section, showing a golf ball in accordance with the principles of the present invention.

In golf balls of the present invention, the shell is initially preformed in the shape of a hollow sphere. As described below, preferably the shell is made from a synthetic polymeric material(s) and a variety of different manufacturing or fabricating methods may be utilized to preform the hollow spherical shell. The wall of the shell may be either solid or cellular.

After or while the shell is being formed, core material is introduced into the interior of the shell. Preferably the core material is a liquid or a unitary, non-cellular material which at the time of its introduction into the shell may be handled as a liquid. As noted below, the core material may, in some embodiments, be introduced into the shell through a hole or holes in the shell or while the shell is being blow molded.

After its introduction, the core material forms a homogeneous core which substantially fills and conforms to the intersurface of the shell. In this latter regard, filling the shell, except for a 1/16–1/8 inch diameter "air" bubble in a conventional sized golf ball, constitutes substantially filling the shell since such an "air" bubble should not materially detract from or adversely effect the intended performance of the golf ball.

As also discussed below, a variety of materials, it is believed, may be used to make shell and for the core. What is important concerning the selection of the shell and core materials is that the shell is the principal transferring energy component of the golf ball, that is, for transferring energy from the golf club to the golf ball when the ball is struck by the club. The core need not contribute anything to this transfer of energy. Its primary function is to give the ball the weight desired and have the ball conform to the U.S.G.A. specifications. This does not mean, however, that the core could not be "tailored" to give the ball a particularly desired or better distortion characteristics on the club face, or in certain instances, could not be made to somewhat change the ball's performance characteristics. For example, a material might be added to the core to increase the pressure within the shell or material—such as a suspension solution, with free floating particles—could be added to the liquid core material to absorb some energy.

As noted, the shell material provides most or all of the energy transfer or resilience necessary for the proper distance performance of the golf ball of the present invention. It will, however, be understood by those skilled in the art that the properties of the shell material and the thickness of the shell are inter-related. These two variables must be tuned to optimize performance.

Materials for the Shell

As noted, thermoplastic materials are generally preferred for use as materials for the shell. Typically, but not limiting of the properties desirable for the synthetic polymeric resins, are good flowability, moderate stiffness, high abrasion resistance, high tear strength, high resilience, and good mold release, among others.

Preferred polymeric materials for use in accordance with this invention are ionic copolymers. Such copolymers include those which are available under the trademark SURLYN from E. I. DuPont De Nemours & Company of Wilmington, Del. (copolymers of ethylene and methacrylic acid partially neutralized with zinc, sodium or lithium); and those which are available and under the trademarks IOTEK or ESCORE from Exxon Chemical Company, Houston, Texas, (copolymers of ethylene and acrylic acid partially neutralized with zinc or sodium).

In the preferred embodiments of this invention, the shell is formed from mixtures or blends of zinc ("Zn") and sodium ("Na") ionic copolymers. Both "high acid" and "standard" IOTEK and SURLYN materials can be and have been used, for example, IOTEK 959 (Na) and IOTEK 960 (Zn) (50/50 weight/weight blend); IOTEK 8000 (Na) and IOTEK 7000 (Zn) (75/25 weight/weight blend); SURLYN 8940 (Na) and SURLYN 9910 (Zn) (50/50 weight/weight blend). [The blend ratios are flexible. For example, a 90/10 to 10/90 blend of IOTEK 8000 and IOTEK 7000 is acceptable; the 75/25 blend noted above does give a good cost/performance balance.]

Combinations of standard SURLYN (Na/Zn) materials and high acid IOTEK (Na/Zn) materials, and visa-versa, may also be used. Also where the shell is formed as center (e.g., with a diameter of about 1.50 inches) by blow molding, the shell walls could comprise a single material or layers of different materials, as explained below, and the material(s) could be standard or high acid SURLYN (Na/Zn) materials and/or the IOTEK materials. Similarly the outer, cover layer, which is injection molded over this shell or center core, could likewise be standard or high acid SURLYN (Na/Zn) or IOTEK. As noted above, those skilled in this art will recognize that the selection of the specific materials to be used will depend on the particular golf ball performance desired.

Ionic copolymers of the type suitable for use in this invention are further described in U.S. Pat. No. 3,819,789 issued Jun. 25, 1974, in U.S. Pat. No. 3,264,272 issued Aug. 2, 1966; U.S. Pat. No. 4,679,795 issued Jul. 14, 1987; and U.S. patent application Ser. No. 08/174,765 filed Dec. 27, 1993. Singular ionic copolymers can be used as shell materials in the subject invention. These singular materials are described in U.S. Pat. No. 3,454,280 issued Jul. 8, 1969. The present invention may likewise be used in conjunction with cellular polymeric golf ball shells as are described in U.S. Pat. No. 4,274,637 issued Jun. 23, 1981.

In accordance with the various embodiments of the present invention, the walls of the shells may be of a thickness from about 0.060 inches to about 0.410 inches, preferably between about 0.075 inches and about 0.300 inches and even more preferred, between about 0.090 inches and about 0.190 inches. Standard golf ball covers in use today generally have a thickness of about 0.090 inches. The specific gravity of the shell, as described above, is between about 0.75 and about 1.25, and preferably about 0.97.

Synthetic polymeric materials, other than those described above, which may be used in accordance with this invention as shell materials include homopolymeric and copolymer materials which may be adapted for use in this invention as follows: (1) Vinyl resins formed by the polymerization of vinyl chloride, or by the copolymerization of vinyl chloride with vinyl acetate, acrylic esters or vinylidene chloride; (2) Polyolefins such as polyethylene, polypropylene, polybutylene, and copolymers such as polyethylene methylacrylate, polyethylene ethylacrylate, polyethylene vinyl acetate, polyethylene methacrylic or polyethylene acrylic acid or polypropylene acrylic acid or terpolymers made from these and acrylate esters and their metal ionomers, polypropylene/EPDM grafted with acrylic acid as sold under the trademark POLYBOND by Reichhold Chemicals, Inc., Hackettstown, N.J. 07840, or anhydride modified polyolefins as sold under the trademark "PLEXAR" by Northern Petrochemical Company, Rolling Meadows, Ill. 60008. (3) Polyurethanes, such as are prepared from polyols and diisocyanates or polyisocyanates; (4) Polyamides such as poly (hexamethylene adipamide) and others prepared from diamines and dibasic acids, as well as those from amino acids such as poly (caprolactam), and blends of polyamides with SURLYN, polyethylene, ethylene copolymers, EDPM, etc. (5), acrylic resins and blends of these resins with poly vinyl chloride, elastomers, etc.; (6) Thermoplastic rubbers such as the urethanes, olefinic thermoplastic rubbers such as blends of polyolefins with EPDM, block copolymers of styrene and butadiene, or isoprene or ethylene-butylene rubber, polyether block amides, an example of such a product is sold under the trademark PEBAX by Rilsan Industrial, Inc., Birdsboro, Pa. 19508; (7) Polyphenylene oxide resins, or blends of polyphenylene oxide with high impact polystyrene as sold under the trademark NORYL by General Electric Company, Pittsfield, Mass.; (8) Thermoplastic polyesters, such as PET, PBT, PETG and elastomers sold under the trademark HYTREL by E. I. DuPont De Nemours & Company of Wilmington, Del. and the trademark LOMOD by General Electric company of Pittsfield, Mass.; (9) Blends and alloys including polycarbonate with ABS, PBT, PET, SMA, PE elastomers, etc. and PVC with ABS or EVA or other elastomers; and (10) blends of thermoplastic rubbers with polyethylene, polypropylene, polyacetal, nylon, polyesters, cellulose esters, etc. In the above description shorthand symbols are used to describe certain polymers. The symbols used above and their description are as follows:

ABS—Acrylonitrile butadiene styrene;
PBT—Polybutylene terephthalate;
PET—Polyethylene terephthalate;
SMA—Styrene maleic anhydride;
PE—Polyethylene;
PETG—Polyethylene terephthalate/glycol modified;
EPDM—Ethyl-propylene-non-conjugateddiene terpolymer;
PVC—Polyvinyl chloride; and
EVA—Ethylene vinyl acetate.

Additionally, U.S. patent application Ser. Nos. 08/366,365, 07/981,751, and 08/174,765, filed on Dec. 29, 1994, Nov. 25, 1992, and Dec. 12, 1993, respectively, also disclose ionomers usable as materials for shells. The above listing is not meant to be limiting or exhaustive, but merely illustrates the wide range of polymeric materials which may be used to form shells in the present invention. Mixtures of the above-described materials may also be used. Further, the polymers used to form the outer shell, in accordance with the present invention, may be stress oriented subsequent to the formation of the shell. Likewise, in accordance with the present invention, the polymeric materials may be reinforced when utilized in the shell. In summary and as can be seen from the discussion above, the subject invention can be used in conjunction with a wide variety of polymeric materials which are suitable for the formation of shells.

It is also within the purview of this invention to add to the shell compositions of this invention materials which do not affect the basic novel characteristics of the composition of this invention. Among such materials are antioxidants, antistatic agents, and stabilizers.

The white basic color of the golf ball shell may be formed by the pigmentation of one of the above-mentioned polymeric materials. Suitable pigments for use in accordance with this invention include the following: titanium dioxide, zinc oxide, zinc sulfide and barium sulfate.

The amount of pigment used in conjunction with the polymeric shell composition naturally depends on the particular polymeric material utilized and the particular pigment utilized. The concentration of the pigment in the polymeric shell composition can be from about 1 percent to about 25 percent as based on the weight of the polymeric material. A more preferred range is from about 1 percent to about 5 percent as based on the weight of the polymeric material. The most preferred range is from about 1 percent to about 3 percent as based on the weight of the polymeric material. The percent pigment utilized is in large part determined by the weight needed to provide a golf ball with the preferred physical characteristic. It is understood by one skilled in the art that the percent of pigment added must be balanced with the weight of the core material in order to attain the desired density of the resulting golf ball.

Preferred shell compositions for use in accordance with this invention are the ionomers described above including SURLYN and IOTEK resins and they may be used in conjunction with fillers, pigments and other additives. The presently most preferred pigment for use in accordance with this invention, if one is to be used, is titanium dioxide. When this combination of components is utilized, it is preferred that the concentration of titanium dioxide in the shell composition be from about 1 percent to about 10 percent as based on the weight of SURLYN resin utilized. A more preferred range for the concentration of titanium dioxide is from about 1 percent to about 5 percent as based on the SURLYN resin utilized. A most preferred concentration for the titanium dioxide is about 2 percent as based on the weight of the SURLYN or IOTEK resin utilized.

As has been amply discussed above, the subject invention can utilize a wide variety of polymers. When pigmented, many of the polymers in question, and in particular SURLYN or IOTEK resins, may not be glossy after injection molding. Experience in the marketplace has demonstrated that the average golfer prefers a glossy golf ball. In order to produce glossy golf balls, the balls of this invention may be coated with a clear epoxy-urethane system subsequent to molding. The system in question of a clear epoxy primer and/or water borne primer, followed by a clear urethane coat. Use of this clear coat system subsequent to the molding operation is not mandatory in order to achieve the desirable results of this invention; however, it is highly desirable. In addition to high initial gloss, the above-mentioned system produces a golf ball which is durable and maintains its gloss during play. It will be understood by those skilled in the art that other clear coat systems can likewise be utilized. Further, it is understood by one skilled in the art that the golf balls of the invention can be painted with a pigmented paint in a conventional manner.

The Core

Figure 2:
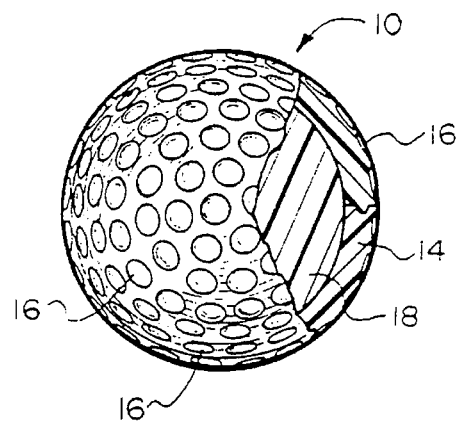
FIG. 2 is an elevational view, similar to that of FIG. 1, but illustrating an alternate core construction.
Figure 3:
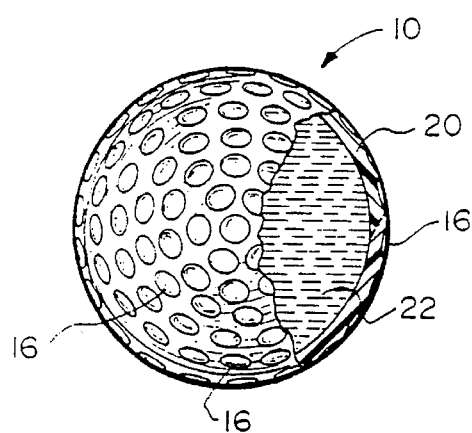
FIG. 3 is an elevational view, similar to FIG. 1, but showing an alternate, thin wall shell construction.
Figure 4:
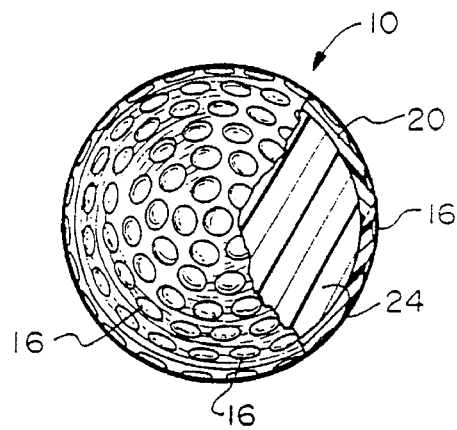
FIG. 4 is an elevational view, similar to that of FIG. 3, but illustrating another alternate core construction.

It should be appreciated that a wide variety of materials could be utilized for a core including gels, hot-melts, liquids, and other materials which at the time of their introduction into a shell, can be handled as a liquid. Examples of suitable gels include water gelatin gels, hydrogels, and water/methyl cellulose gels. Golf ball embodiments with a gel or other solid core are shown in FIGS. 2 and 4. Hot-melts are materials that are heated to become liquid and at or about normal room temperatures become solid. This property allows their easy injection into the shell to form the core. Examples of suitable liquids, as shown in FIGS. 1 and 3, include either solutions such as glycol/water, salt in water or oils or colloidal suspensions, such as clay, barytes, carbon black in water or other liquid, or salt in water/glycol mixtures.

The presently preferred materials are liquids. A preferred example of a suitable liquid core material is a solution of inorganic salt in water. The inorganic salt is preferably calcium chloride. Other liquids that have been successfully used are conventional hydraulic oils of the type sold at, for example, gasoline stations and that are normally used in motor vehicles.

The liquid material, which is inserted in the shell in accordance with this invention to form the core, may also be reactive liquid systems that combine to form a solid. Examples of suitable reactive liquids are silicate gels, agar gels, peroxide cured polyester resins, two-part epoxy resin systems and peroxide cured liquid polybutadiene rubber compositions. It will be understood by those skilled in the art that other reactive liquid systems can likewise be utilized depending on the physical properties of the shell and the physical properties desired in the resulting finished golf balls.

The core of all embodiments, whether remaining a liquid or ultimately becoming a solid, should be unitary, that is, of a substantially common material throughout its entire extent or cross-section, with its exterior surface in contact with substantially the entire interior surface of its shell. All cores are also essentially substantially homogenous throughout.

In the preferred embodiments, in order to provide a golf ball which has similar physical properties and functional characteristics to conventional golf balls, preferably the core material will have a specific gravity greater than that of the shell (and the outer cover when such a cover is molded over the shell). Specifically, the core material may have a specific gravity of between about 0.8 and about 3.9, preferably at about 1.32. The specific gravity of the core material may be selected so that the golf ball will float in water. Thus, it will be understood by those skilled in the art that the specific gravity of the core may be varied depending on the physical dimensions and density of the outer shell and the diameter of the finished golf ball. The core (that is, the inner diameter of the shell) may have a diameter of between about 0.860 inches and about 1.43 inches, preferably 1.30 inches.

The Structure of the Golf Dalls and Methods of Manufacture

A golf ball 10 constructed in accordance with the principles of the present invention is shown in FIG. 1. The golf ball 10 maintains or improves the performance of presently known and utilized golf balls. It includes two major components: a core or internal portion 12; and a shell or external portion 14. The shell 14 is formed in a substantially hollow spherical configuration, and the core 12 is a liquid material. The exterior surface of the liquid core 12 is and remains in contact with the interior surface of the shell which has a generally spherical shape.

As shown in FIG. 1, the outer, exterior surface of the shell 14 may be formed with conventional dimples 16 to provide improved flight characteristics and to create an appearance essentially identical with conventional, commercially available golf balls. The selection of the dimples and the dimple pattern is within the purview of those skilled in the golf ball art.

In the FIG. 2 embodiment, the core 18, is of a solid material rather than as liquid material as is the core 12 of the FIG. 1 ball. Preferably, however, this solid material is or can be handled as a liquid at the time this material is introduced into the shell. FIGS. 3 and 4 illustrate further, alternate embodiments of the invention shown in FIGS. 1 and 2, respectively, but where the thickness of the shell wall is thinner, that is, a thin wall shell 20 is shown with a liquid core 22 in the FIG. 3 embodiment, and a thin wall shell 20 with a solid core 24 is shown in the FIG. 4 embodiment.

With reference to FIGS. 5–10, and to one of the preferred methods of manufacture of the golf balls as described above, two hemispherically-shaped shell halves 28 and 30 are formed, preferably through injection molding, prior to being joined or coupled to form a completed spherical shell. Other techniques for forming the shell halves include conventional blow molding, injection blow molding and rotational casting.

Figure 5:
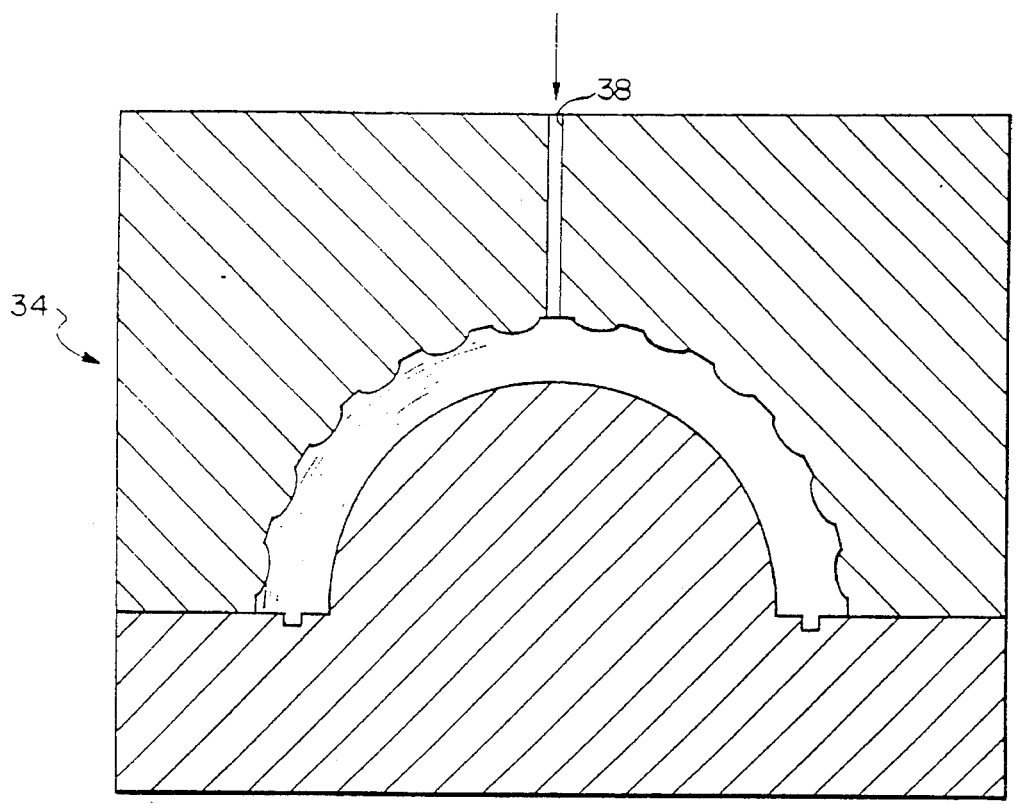
FIGS. 5 and 6 are sectional views of mold halves for forming the two mating, molded halves of a golf ball shell.
Figure 6:
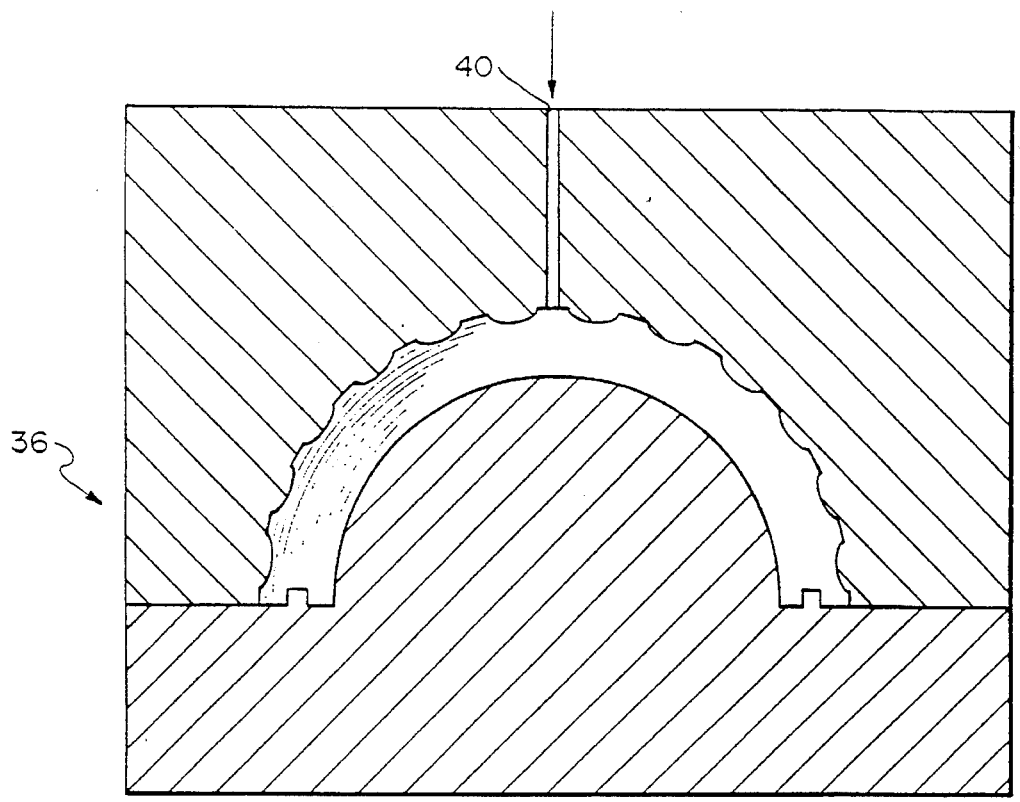
Figure 7:
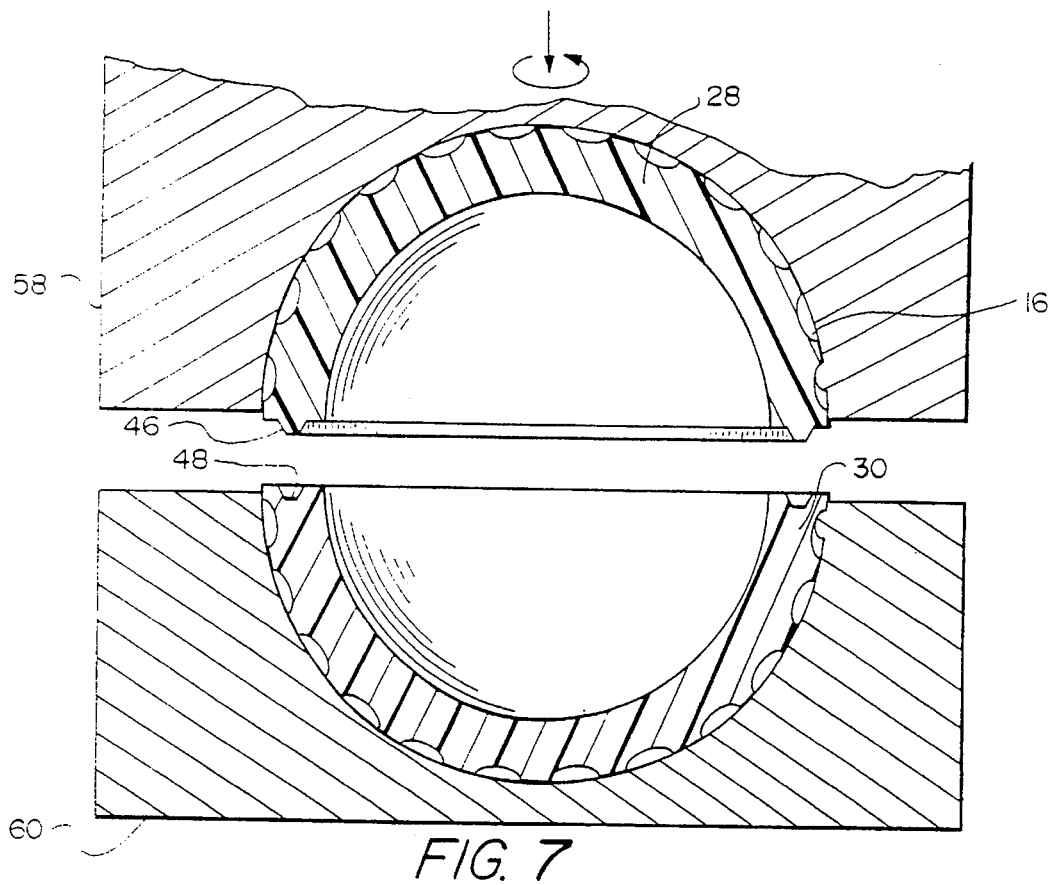
FIG. 7 is a sectional view of two hemispherical shell halves loaded in opposed fixtures of a spin welding machine prior to being coupled together to form a spherical shell.
Figure 8:
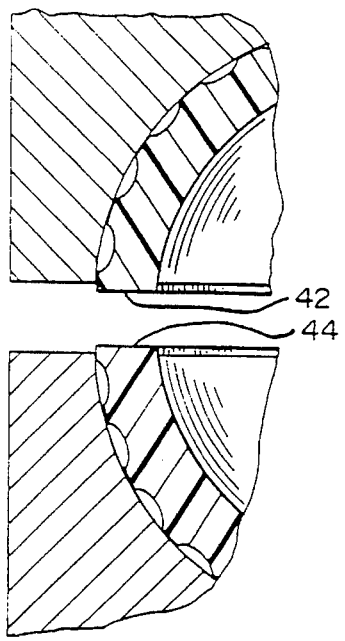
FIGS. 8, 9 and 10 are fragmentary views of alternate ways molded shell halves can be formed and also show parts of the fixtures used to join such molded halves.
Figure 9:
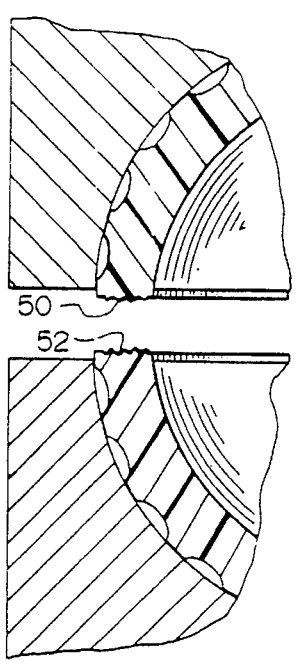
Figure 11:
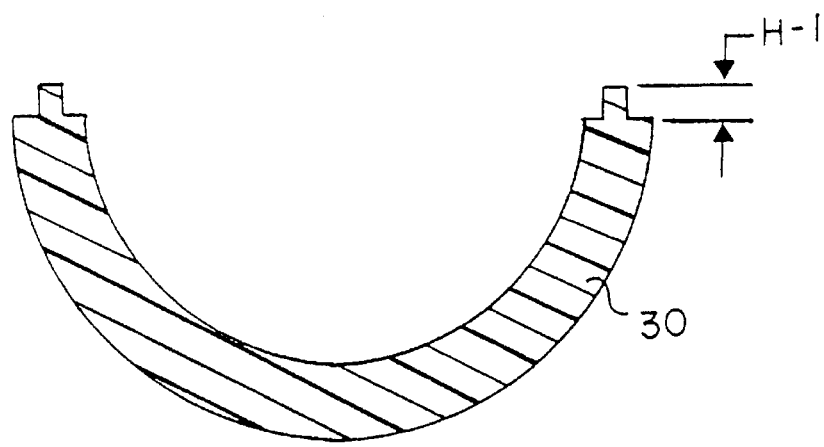
FIGS. 11 and 12 are sectional views of molded shell halves prior to being joined.
Figure 12:
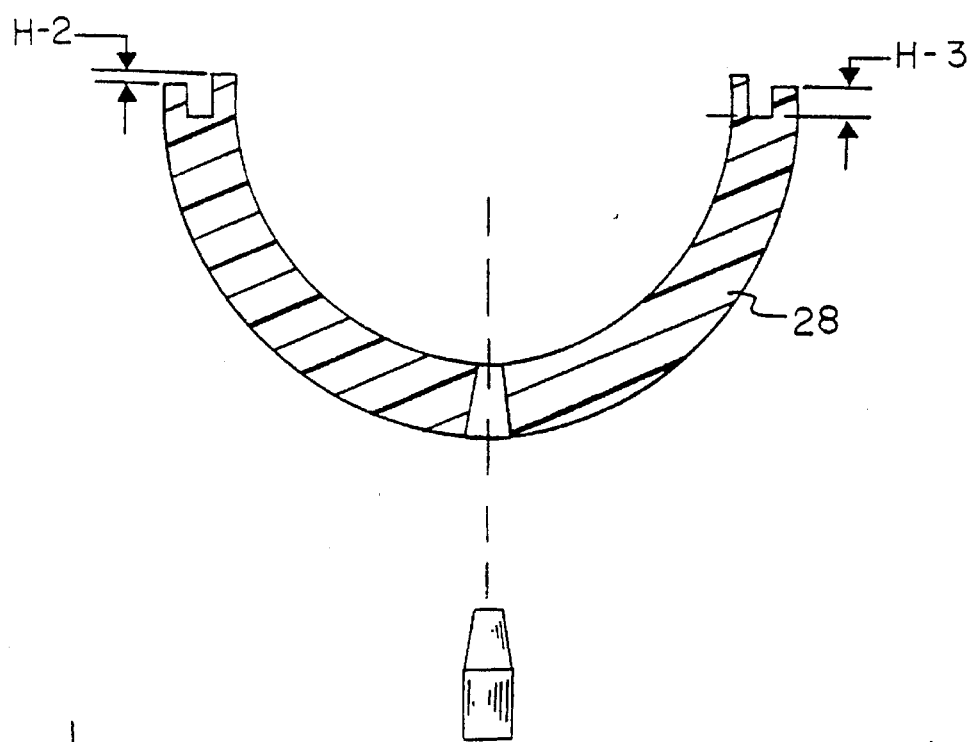
Figure 13:
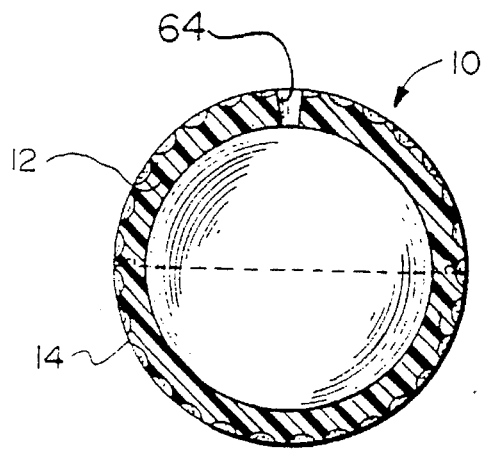
FIGS. 13, 14 and 15 are sectional views of a golf ball after the shell halves have been joined together and also illustrating the injection of liquid core material into the shell to fill the shell.
Figure 14:
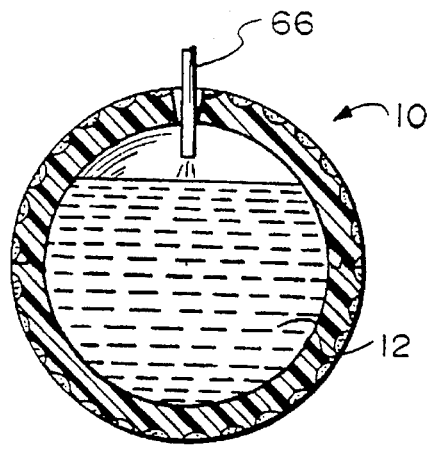

FIGS. 5 and 6 illustrate mold halves 34 and 36 that include holes 38 and 40 for the introduction of the material, in fluid form, from which the shell is to be formed. These mold halves 34 and 36 may be identical in shape except at their equator where they are joined and where they may or may not be identical. As illustrated in FIG. 8, the mold halves may be fully identical with flat, planar surfaces 42 and 44 at the equator of the ball, at the areas of joining illustrated in FIG. 8. A preferred alternative, however, would be to provide male and female tongue 46 and groove 48 surface configurations to assist in the proper placing of the halves with respect to each other. FIGS. 11 and 12 illustrate a tongue and groove arrangement with the tongue of a length H-1 slightly less than the length H-2 of the interior wall of the groove but slightly greater than the length H-3 of the exterior wall of the groove. FIGS. 1 and 2, as well as FIGS. 5, 6 and 7, also illustrate this alternative. Other configurations at the equator could also be utilized, such as a mating undulations 50 and 52 of male and female segments across the thickness as shown in FIG. 9.

Figure 10:
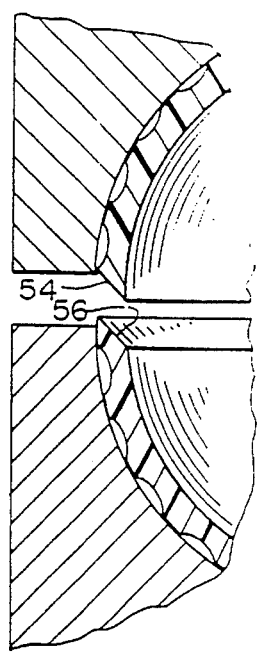

In the embodiment of the thin walled shells of FIGS. 3 and 4 and 10, the parting line 54 and 56 may take the form of a cylinder around the periphery of the ball, with the parting line in an orientation at an angle to the equator of the ball. This forms a triangular projection in the lower shell half and a mating triangular recess in the upper half. Additional surface area is thus provided for bonding purposes. Further, during spin welding, centrifugal forces acting with the shell edges and tooling wall urge together the mating halves for superior joining or coupling.

The dimples 16 on the exterior surface of the shell halves may be formed during the injection molding of the halves. It should be appreciated, however, that in certain embodiments, the ball may be molded with a smooth exterior surface and the dimples molded in after the joining of the halves are joined together and either before or after the injection of the core and plugging of the hole. The temperature for such subsequent dimple molding must be sufficiently low so as not to be detrimental to the core.

The hemispherical halves may be joined together by any one of a wide variety of methods. A preferred method is the spin welding of the halves. This can be effected by fixedly supporting one of the halves 30 in a fixed fixture 60, shown as the lower half in FIG. 7, and supporting the other half 28, shown as the upper half, in a fixture 58 that is rapidly rotated about a vertical axis while moved axially toward the fixed half. Note the arrows included in FIG. 7. The frictional energy generated by the movement of one half with respect to the other, while being brought into contact, will generate sufficient heat to create a final cohesive bond between the melting and coalescing thermoplastic materials of the halves. The resulting structure is then a preformed, unitary hollow sphere that constitutes the shell of the ball.

Spin welding techniques are conventional as described, for example, in U.S. Pat. No. 2,956,611 to Jendrisak. A commercially available spin welding machine, acceptable for performing this method, is Model No. SPW-1-EC manufactured by Olsen Manufacturing Company of Royal Oak, Mich.

Other coupling techniques may, however, be readily utilized for joining the halves. Such other techniques include known methods such as ultrasonic welding, vibrational welding, laser welding, solvent welding, compression molding or even adhesive bonding with a suitable adhesive having properties matched to the properties of the shell halves.

Next in the manufacturing process for a preferred embodiment is the forming of the hole 64 in the shell 14 as for example, by drilling. The hole 64 could also be formed during molding. The hole is preferably tapered radially inwardly toward the center of the spherical shell 14 to facilitate its subsequent closure. It will be understood by those skilled in the art that two or more holes of the same or different sizes may be drilled or molded for the purposes associated with injecting the liquid material into the core 12 of the shell. Thereafter the core material may be injected through the hole 64 into the center of the shell, as through a hypodermic needle 66, or similar injection device, to substantially, totally fill the center of the shell for constituting the core 12.

A conical plug 68 may be used for plugging of the hole 64. The material of the plug 68 is preferably the same as that of the remainder of the shell 14. Trimming its cylindrical radial outwardly extending end of the plug 68 completes the fabrication method unless, of course, the dimples are to be applied following their manufacturing steps. The plug 68 may be secured in the hole to seal the shell through any of the above described fabrication techniques, although spin welding being presently preferred. In certain embodiments, the core material may itself be relied upon to seal the hole.

Figure 16:
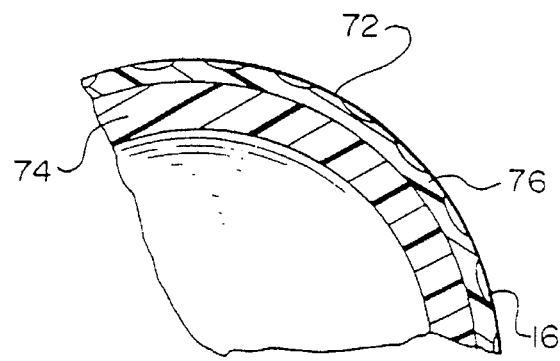
FIGS. 16, 17, 18 and 19 illustrate, in fragmentary sectional views, additional embodiments of shell construction where the shells are tailored to yield intended physical characteristics.

The shell 72, shown in FIG. 16, is formed of a first or inner layer 74 having a radial thickness slightly less than the final golf ball. This shell layer 74 constitutes an internal layer of the final composite shell or laminate formed of plural shell layers. A final exterior shell layer 76 is applied to the exterior surface of the internal shell layer 74, preferably through conventional molding techniques, such as injection, compression, or rotational molding techniques. The exterior surface 76 of the shell is fabricated with dimples 16.

By fabricating the shell as a multi-layer laminate, the shell materials can be selected for tailoring the performance of the golf ball to a particular use or application. For example, properties, such as color, frictional bite, durability, and resistant to scuffs and cuts, may be built into the radial outer layer. The radial inner layer could simply provide desired resilience or energy transfer. In other words, the inner layer could be made of a polymeric material having a relatively high modulous of elasticity for increased life and resilience while the outer layer could be formed of a polymeric material providing modulous greater frictional contact with the face or ball striking surface of the golf club so as to achieve greater bite, playability and control. "Brightness" could be added to the outer layer only for minimizing the utilization of such relatively expensive, conventional brightening agents. Similarly, to minimize costs, a relatively inexpensive polymeric material, for example, polyethylene, could be used for the inner layer while a presently more expensive IOTEK material could be used for the outer layer.

The shell 72 and its core may be manufactured or fabricated by any one of the techniques as described above. Specifically, the shell 72, which, as noted, is formed of a plurality of bonded layers, could also be manufactured in a conventional shuttle method. In this method, the inner molded layer is first injected into the mold to form the inner layer. Thereafter, or visa versa, the outer layer, of a different material than the inner layer, is injected over the first, inner layer. This may be effected through consecutive shootings into a common mold over a mold component in the fabrication of layered shell halves. This molding technique is common in the molding of typewriter keys wherein the different injected materials form the visible (contrasting colored) lettering on the keys.

Figure 17:
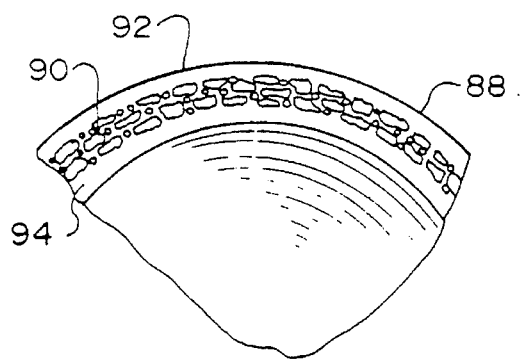
Figure 18:
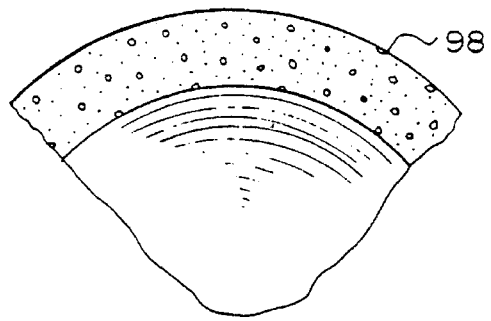
Figure 19:
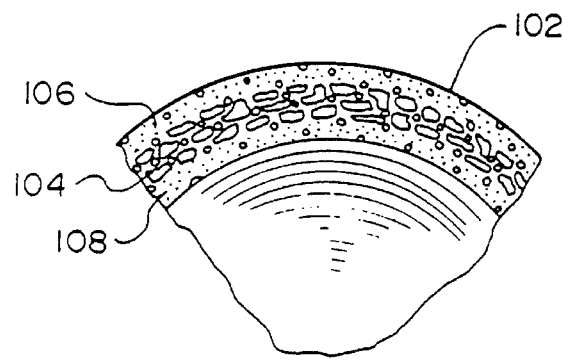

FIGS. 17, 18 and 19 illustrate three other alternative embodiments of a shell for the subject invention where the shell properties may be tailored to a particular application or use. These three shell embodiments, illustrated in FIGS. 17, 18, and 19, as well as in FIG. 16, may be made by fabricating a hollow shell or by joining hemispherical molded halves.

FIG. 17 illustrates a shell 88 having a central cellular stratum or layer 90 sandwiched between two non-cellular skins or layers 92 and 94. These non-cellular skins 92 and 94 may be formed in situ by varying the process parameters wherein the shell 88 is molded. Skins 92 and 94 may be altered and formed by a plurality of techniques. For example, the skins 92 and 94 may be formed by varying the temperature of the mold during the initial stages of the injection molding process and by varying other parameters, such as melt temperatures, injection time, injection speed, injection pressure, nozzle type, gating, venting, holding pressure, holding time, shot weight, blowing agent concentration, nucleator concentration, polymeric composition, mold surface treatment and mold lubricant. U.S. Pat. No. 4,274,637 to Robert P. Molitor includes further details.

FIG. 18 illustrates a shell 98 having an essentially uniform cellular structure. In this embodiment, the shell 98 is shown molded over a hemispherical mold half.

FIG. 19 illustrates still another shell 102 which has a central stratum or layer 104 sandwiched between a pair of strata or layers 106 and 108. The central stratum 104 has an density which is less than that of the strata 106 and 108. To put it in other words, the strata 106 and 108 have a greater density than that of the central stratum 104. Naturally, those skilled in the art will recognize that in the region of the interfaces between the stratum, the density will vary. The respective densities of the strata can be varied by those skilled in the art by altering the process parameters as discussed above.

Figure 20:
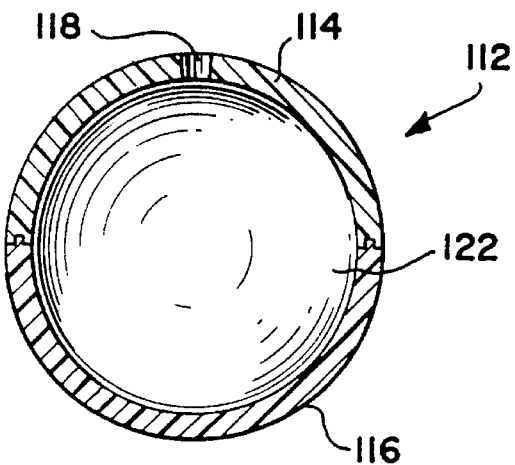
FIGS. 20, 21, 22, 23 and 24 illustrate another method of golf ball manufacture or fabrication, and a golf ball constructed in accordance with that method.

FIGS. 20 through 24 illustrate still further embodiments of the present invention. Specifically, a shell 112 is fabricated from two hemispherical members 114 and 116 which are coupled together, for example, by spin welding. A hole 118 is formed in the hemispherical shell member 114 as shown in FIG. 20.

The steps of fabricating the shell 112 are essentially the same as those described above. The most significant difference, is however, in the size of the shell wherein the exterior diameter is slightly less than that of the contemplated, completed golf ball. When so sized, the filled shell (that is, the shell and core) can, as noted above, be also referred to as a center or golf ball center.

Figure 21:
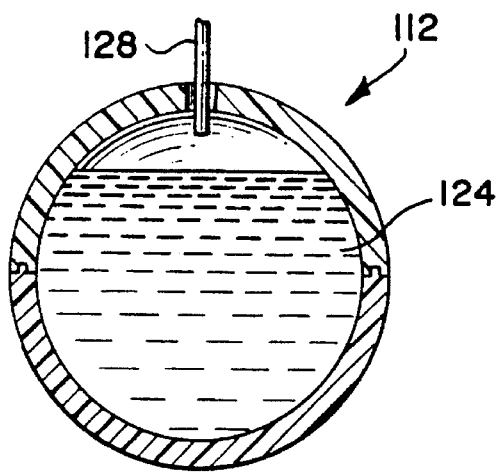
Figure 22:
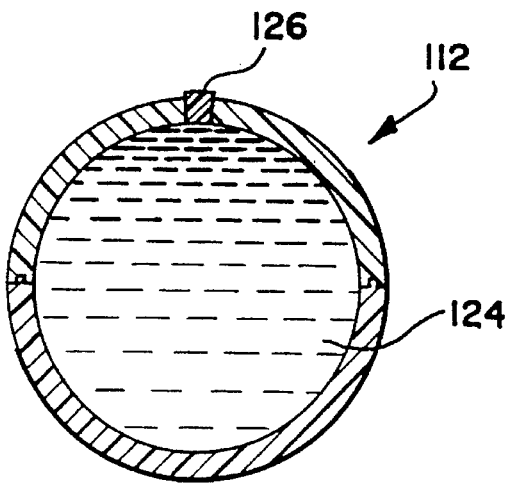

FIGS. 21 and 22 illustrate methods of filling a shell similar to those previously discussed wherein the interior 122 of the shell or center 112 is filled with a liquid 124 through a drilled filling hole 118. A needle or similar device 128 is injected into the shell 112 through the hole 118 and is used for filling the interior of the shell. Thereafter, the filling hole 118 is closed through the use of a plug 126. The radially outer, exposed end of the plug 126 is next ground so its exterior surface is essentially coextensive with the exterior spherical surface of the remainder of the shell or center 112.

Figure 23:
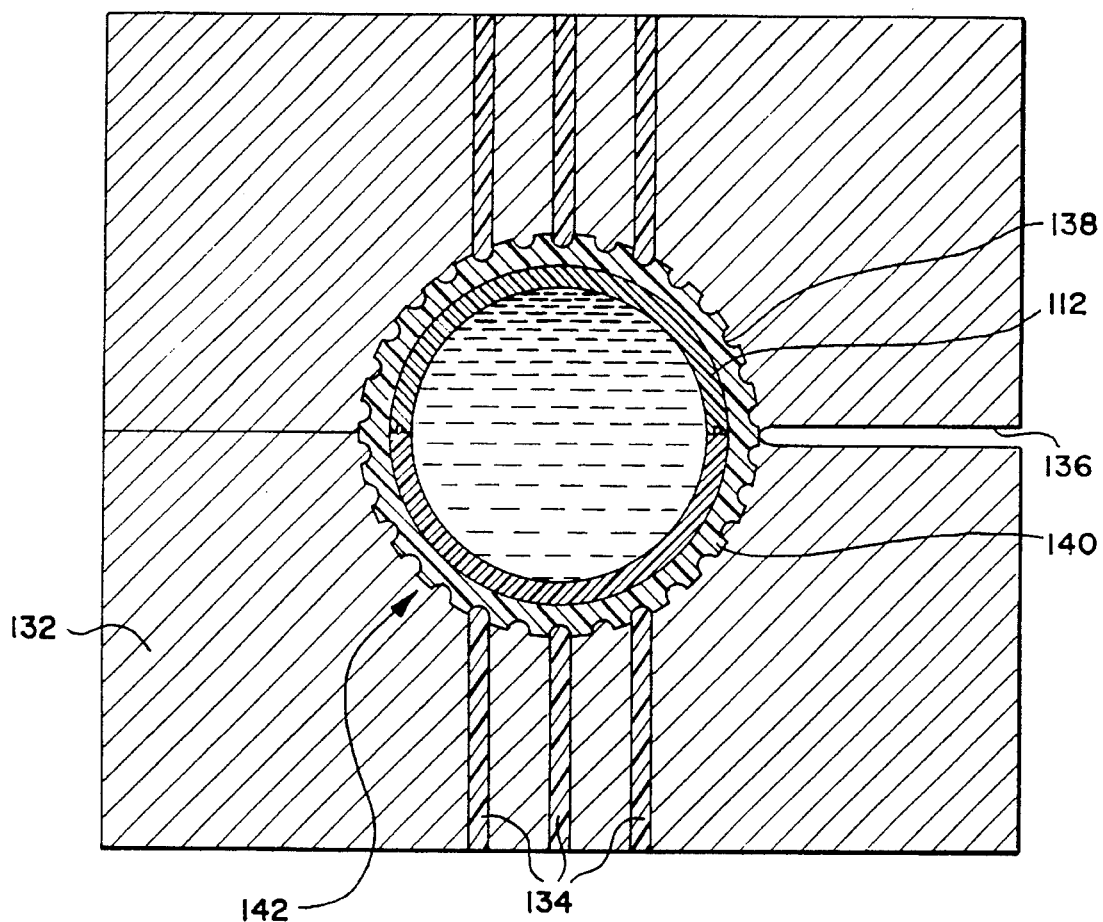

FIG. 23 illustrates a two-piece injection mold 132 with the spherical, filled center 112 centrally located therein. The center 112 maybe held in position centrally within the mold 132 by pins (not shown) in a conventional manner. The mold 132 is then filled through an entrance port 136 to provide a layer of polymeric elastomeric material of an even thickness, completely around the previously formed center 112. The elastomeric layer is allowed to harden and bond to the center 112 and after trimming, forms a one-piece outer cover 140 for the final, finished golf ball 142. Dimples 138 are provided to the exterior surface of this cover 140 through the configuration of the mold or, in the alternative, the dimples may be formed separately in the finished golf ball 142.

Figure 24:
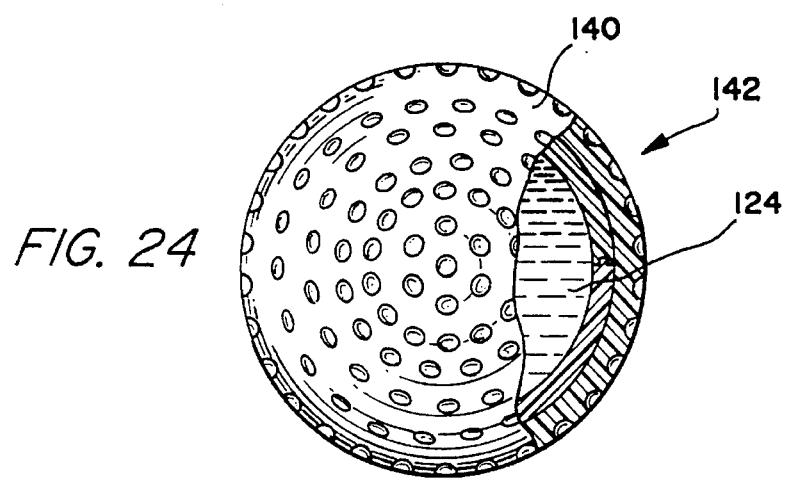

Stated again, in the final finished golf ball 142, as seen in the FIG. 24, the core of the ball 124 is an injected liquid that is disposed within an intermediate center or shell 112 formed of mating, spin welded, hemispherical parts. The use of exterior, one-piece cover 140 thereover provides additional stability to the ball 142 during play. The elastomeric components of the golf ball 142, including the intermediate two-part center or shell 112 and the exterior one-part cover 142, may be fabricated of any of the materials described above. It may be possible, however, to delete the color imparting, additional materials from the center or shell 112 since it cannot be seen after application of the cover 140.

The entire radial thickness of the center 112 and cover 142, in combination, should be the same, as described above with respect to balls having shells, where the outer surface of the shell is the outer cover of the golf ball, and particularly, is between about 0.060 and about 0.300 inches. In selecting the specific thicknesses of the center and cover, those skilled in the art will appreciate that the center 112 should be of a thickness so that the final hemispheres may be properly handled during fabrication of the golf ball, that is, spin welded, drilled for the injection of the liquid for the core, filled with the core material, and having the drilled holes closed. Similarly, the cover 142 should be of a thickness so that the dimples may be molded or otherwise formed therein and so that adequate strength is provided for holding together the two halves of the center.

In another further, most preferred embodiments, as shown in FIGS. 25–28, a shell 152 is formed as a one-piece unit, preferably by blow molding, with the result that a golf ball 146 may be made relatively inexpensively. In these embodiments, an extrudate or parison is extruded from a starting polymeric, elastomer material, preferably pellets. The extrudate 148 is a continuous tube fed into conventional clam shell mold halves of a blow molding machine. From the extrusion machine, not shown, the extrudate is continuously cut to length and then captured in the mold halves. The mold halves preferably move in a step and repeat manner to receive the extrudate and then move to subsequent locations. In some of these embodiments, the mold halves close and pressurized air is injected into the mold so as to force the extrudate into a desired spherical shaped shell. At the next station, a core material liquid or fluid is injected into the shell through a filling hole, and then the filling hole is plugged or closed.

In other of these embodiments, the core material liquid 156 is used, in lieu of pressurized air, to mold the extrudate into a spherical shaped shell. After the liquid core material 156 is within the shell, the filling hole, if there is one, is plugged or closed.

The interior surfaces of the mold halves may include symmetric projections for directly forming dimples on the outer spherical surface of shell so that shell, with a liquid filled core, constitutes a final golf ball. Alternatively, the shell can be molded as a center (that is, where its outer diameter is less than that of a regulation golf ball) and a dimpled outer cover can thereafter be molded, as by the above noted conventional molding techniques, about the shell or center. Further, a multi-layer parison, that is, a parison of two or more layers of materials, can be extruded simultaneously to form a shell, that is either a center or a dimpled ball. The shell and the golf ball must, of course, be appropriately trimmed, particularly with regard to removing the excess extrudate, after the shell is molded.

More specifically, FIGS. 25A through 25E generally illustrate the steps and/or stations of a fabrication or manufacturing method for the one-piece blow-molded golf ball 146. FIG. 25A shows the output of a conventional extrusion press—an extrudate or parison 148—having enlarged side walls in its central extent or portion. FIG. 25B illustrates the parison or extrudate 148 disposed in the mold of the blow-molding machine at a step or station where the hollow spherical shell 152 is formed internally and dimples are formed on the external surface of the shell. Excessive extrudate material 154 is shown above and below the shell 152. FIG. 25C illustrates station or steep where the filling of the interior of the spherical shell 152 with core material liquid 156 occurs by means of a needle 158 that extends through a filling hole 160 in the upper extent of the shell. FIG. 25D shows the needle 158 removed and a plug 162 closing the filling hole 160. FIG. 25E illustrates the finished golf ball 146 after being trimmed of the excess material including that of the plug 162 above the surface of the ball 146.

FIGS. 26A through 26E illustrates the stations and/or steps of another blow molding fabrication method. FIG. 26A illustrates the same parison or extrudate 148 as used in the prior FIGS. 25A–25E embodiment. FIGS. 26B and 26C show the same method steps or stations that are illustrated in FIGS. 25B and 25C, respectively. However, in closing the filling hole step or station, as illustrated in FIG. 26D, no plug is utilized. Instead, after the removal of the needle 158, the molding machine is provided with mechanisms (not shown) to push extrudate material of the parison located adjacent the filling hole 160 so as to cover and fill the hole 160. FIG. 26E shows the finished golf ball 166, as trimmed, that constitutes the final product.

FIGS. 27A through 27E illustrate the steps and/or stations of still another blow molding fabrication method. The parison 148, shown in FIG. 27A, is slightly smaller than the parison shown in FIGS. 25A and 26A since in this embodiment, blow molding is utilized to fabricate only a golf ball center or shell 170 rather than an entire golf ball itself. The center 170, is about 1.50 inches in diameter, and is blow-molded as shown in FIG. 27B, in the same manner as the shell 152, except no dimples are formed on its external surface. It may be then filled with a fluid 156 and sealed, by and in the blow-molding machine, in a manner similar to the steps shown in FIGS. 25D and 26D. After being trimmed, the center 170 is provided with an outer or exterior cover 172, having dimples, through conventional techniques, such as injection molding techniques. The molded cover 172 is then trimmed to constitute the final golf ball 174 as shown in FIG. 27E.

Figure 28E:
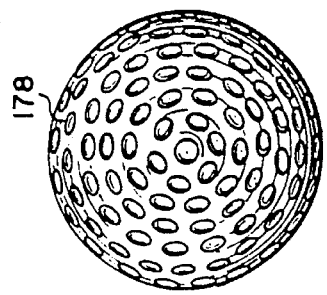
Figure 28D:
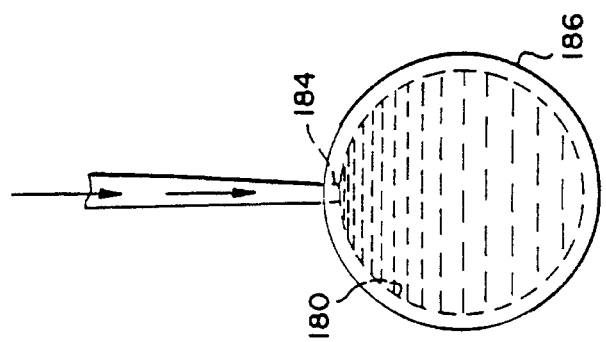
Figure 28C:
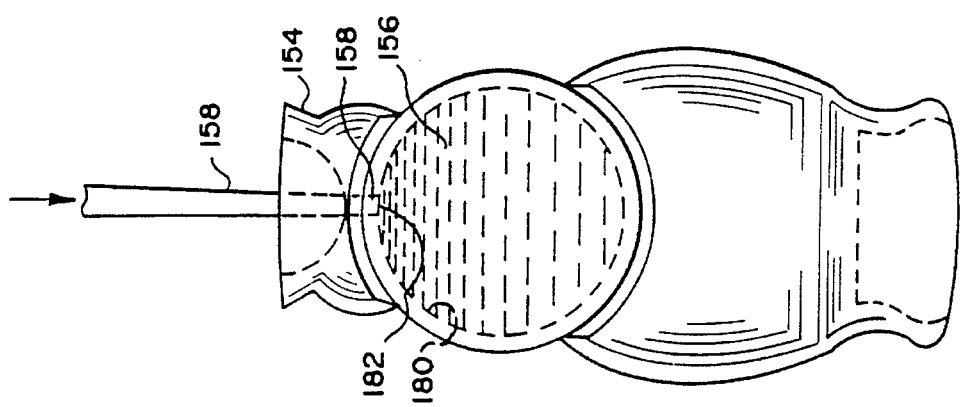
Figure 28B:
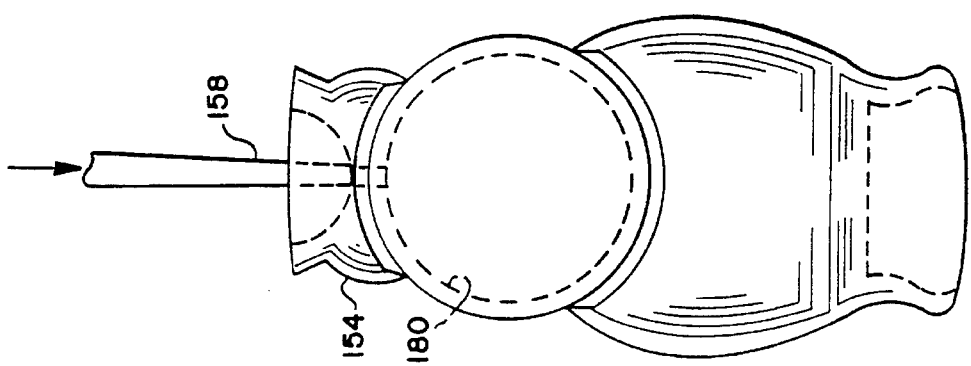
Figure 28A:
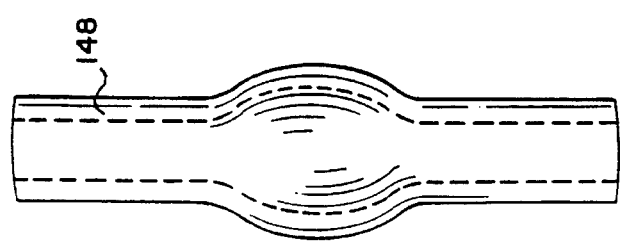

FIG. 28A through 28E illustrate the steps and/or stations of yet another method for fabricating a golf ball 178 with a blow-molded shell or center 180. FIGS. 28A and 28B illustrate the same method steps as shown in FIGS. 27A and 27B. In FIG. 28C, the center is filled with a core liquid 156 through a needle 158 and the filling hole is then plugged with a plug 184 and trimmed as described in the step illustrated in FIG. 25D. While the plug would generally be made from the same material as the shell, (e.g., an ionic material). This, however, is not necessary. Plugs of an elastomeric material (e.g., rubber), which have been elongated to reduce their diameter, have been inserted into the hole of a center (shell), relaxed and have sealed the hole from a bulge or a flange on the inner surface of the center. Such plugs have achieved a tight fit. The application of cover material over the center in the injection molding process does not interfere with the sealing capabilities of such plugs. As in the prior FIG. 27 step, the center 180 then receives an injection molded outer cover 186 having dimples thereon. Thereafter the exterior of the ball 178 is trimmed to constitute the final golf ball as shown in FIG. 28E.

Figure 29E:
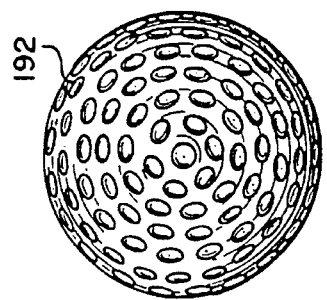
Figure 29D:
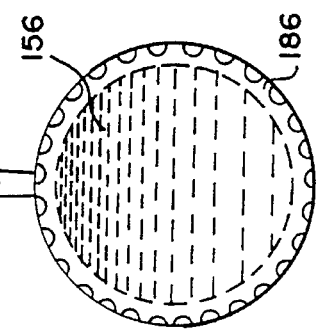
Figure 29C:
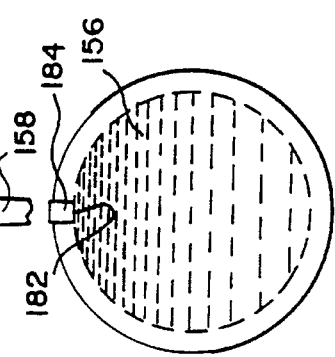
Figure 29B:
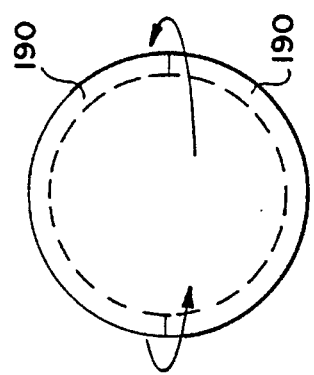
Figure 29A:
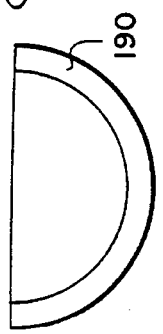

FIGS. 29A through 29E illustrate the several steps and/or stations of a further golf ball fabrication method. Two shell halves 190 are conventionally injection molded and then bonded together as by spin welding as generally illustrated in FIGS. 29A and 29B. FIGS. 29C and 29D illustrates the steps or stations where the drilling of a filling hole 182 in the preformed shell or center occurs, where the shell is filled with core fluid 156 by means of a needle 158, and where the filling hole 182 is subsequently plugged, with a plug 184. Thereafter, a cover 186 is injection molded onto the shell or center, with dimples being formed on the exterior or outer surface of the shell. FIG. 29E illustrates the final golf ball 192 after trimming.

Figure 30E:
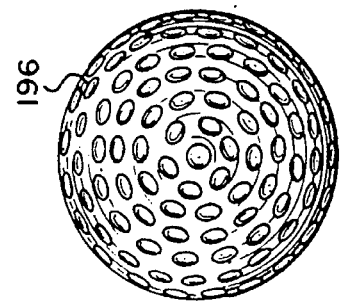
Figure 30D:
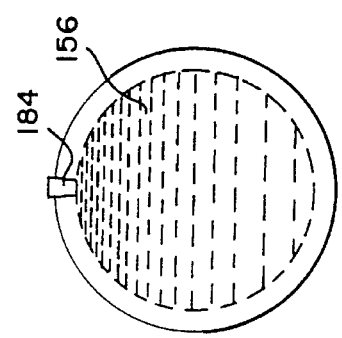
Figure 30C:
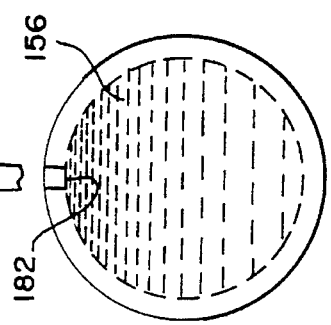
Figure 30B:
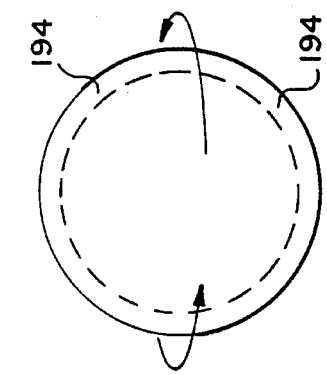
Figure 30A:
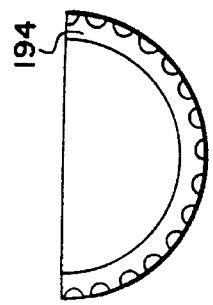
Figures 34A, 34B, 34C, 34D, 34E, 34F:
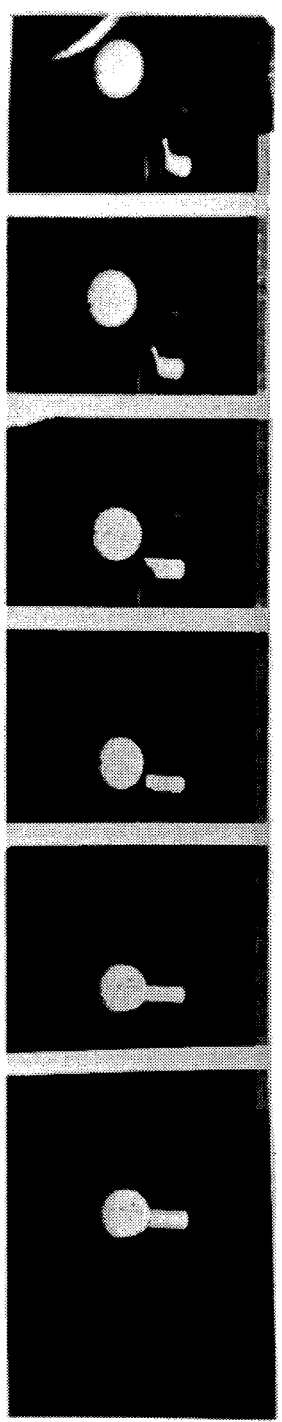
Figures 35A, 35B, 35C, 35D, 35E, 35F:
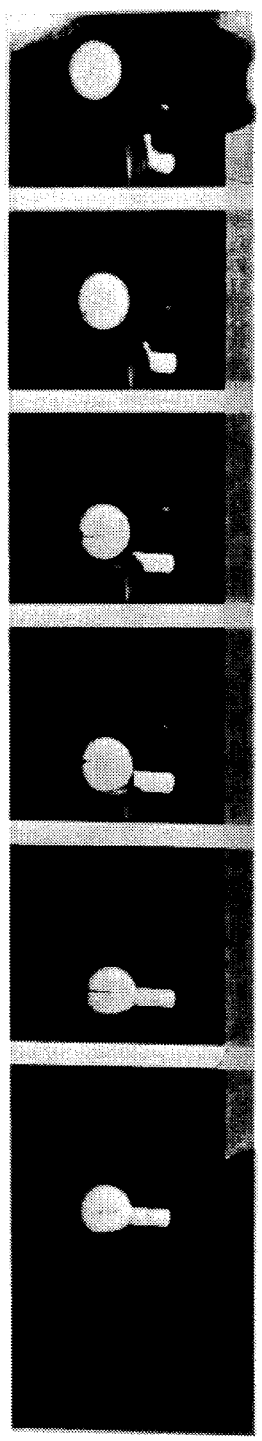
Figures 36A, 36B, 36C, 36D, 36E:
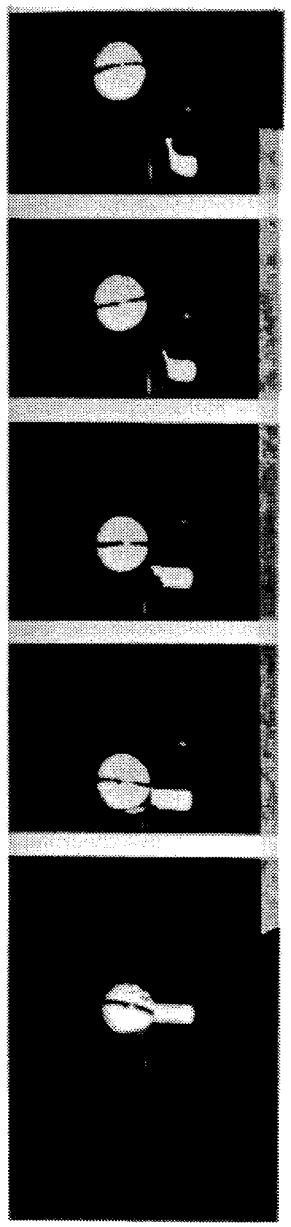

FIGS. 30A through 30E illustrate the steps and/or stations of a still further golf ball fabrication method. Here the shell halves 194 are formed through conventional injection molding techniques and have dimples molded in their outer spherical surfaces. The shell halves are then joined, by spin bonding techniques, to form a preformed shell as generally illustrated in FIGS. 30A and 30B. The steps of drilling of the shell, the filling of the shell 196 with a core fluid 156, and thereafter, closing the fill hole in the shell, by a plug 184, are illustrated in FIGS. 30C and FIG. 30D. Alternatively, and as described in connection with the step shown in FIG. 26D, the fill hole can also be closed by the use of mechanisms (not shown) which push material adjacent to the fill hole so as to cover and fill the hole. The finished golf ball 196, after being trimmed, is generally shown in FIG. 30E.

A comparison of the shells made in accordance with the disclosed blow molding embodiments (e.g. the embodiments illustrated in FIGS. 25 and 27)—vis-a-vis shells made from two injection molded half shells (e.g. the embodiments illustrated in FIGS. 28 and 29)—reveals that there are differences. One is that a parting line seam is formed across approximately 180 degrees of the periphery of a blow molded shell at the mold line and that in the remaining 180 degrees, there is no flash and effectively no seam. This is in contrast to the 360 degree seam in the spin bonded, two half shell shells. Even the seam formed throughout the 180 degrees span in the blow molded shells is superior to the seams where the shells are formed from two half shells that are spin welded together. It is believed that superior shell seams exist in shells, made in accordance with the blow molding embodiments, because those seams are created when the polymeric material is in a melt state.

Having superior seams or no seams is extremely important from a marketing standpoint, and accordingly it would appear that the blow molding fabrication methods will ultimately be the preferred method of manufacturing the unique golf balls of the present invention. While it should be possible to achieve a "good" joining of the two injected molded half shells 99.9% of the time, any failure of the golf balls along the seams could be catastrophic from a marketing point of view, particularly during the initial introduction of the unique golf balls. It would be obviously unacceptable, from a marketing standpoint, if golfers would be splashed with a liquid should the ball parts separate when the golf ball was hit by a golf club.

Advantages of the Unique Golf Balls

Comparisons between samples of the unique golf balls, which were manufactured with blow-molded shells or centers and which were made by applicants' assignee prior to the filing of this application, and conventional TOP-FLITE II brand balls, which were made by applicants' assignee in the regular course of business, discloses that the former have a much greater uniformity in weight. The reason for this greater weight uniformity is in the simplicity in golf ball design and in the manufacturing process used. In contrast, the centers, which are used for conventional, prior art two-piece balls, are solid and must be formed from a complex blend of materials that, as a result of the blending and curing techniques, cannot approach the uniformity of the golf ball of this invention. Further, the centers must be molded, ground, etc. in order to produce centers suitable for the injection molding of a cover thereover.

When Unique golf balls made by the disclosed blow molded processes are compared with the conventional prior art three piece balls, the cores of the three-piece wound balls are found to vary in density, in the tension under which the threads are wound onto the core and in the amount of material which is wound onto the core. All of these factors tend to create a golf ball which is less uniform than the Unique ball where the shell (center) is blow molded, filled with liquid and where a cover is injection molded onto the shell.

The series of successive, high speed, stop action photographs, which are included as FIGS. 31, 32 and 33, are of golf balls being hit by a 5-iron swung at 128 feet per second. The distortion of the Unique golf ball of the present invention, shown in FIG. 32, is significantly greater than that of the conventional, two-piece TOP-FLITE II brand ball shown in FIG. 31. The impact distortion of the ball of the present invention is at least as great as the conventional, three piece, TITLEIST DT brand ball shown in FIG. 33. From FIGS. 31, 32 and 33, it can be seen that the Unique golf ball (FIG. 32) is on the club face of the iron longer than either the TOP-FLITE II or the TITLEIST DT brand balls of FIGS. 31 and 33. The ability to stay on the face longer allows the golfer to impart greater control to the ball as well as giving more time for energy transfer. Further, it tends to give the golfer a superior, much desired "feel".

The series of successive, high speed, stop action comparison photographs of FIGS. 34–36 and FIGS. 37–39 show the same balls (as in FIGS. 31–33, respectively) being struck by a driver swung at 145 fps and at 160 fps, respectively. These photographs again show that the Unique golf ball remains on the club face longer, FIGS. 35 and 38, than either the TOP-FLITE II or the TITLEIST DT brand balls—FIGS. 34 and 36 or FIGS. 37 and 39, respectively. Again, the ability of the golf ball to stay on the club face longer will tend to give the golfer greater control and a better "feel". FIGS. 31–33, 34–36 and 37–39 further show that the Unique ball of the present invention has less back spin than either the TOP-FLITE II or the TITLEIST DT brand balls. Having less back spin when hit, for example, by a driver or a 5-iron is advantageous in obtaining greater distance by a optimized combination of launch angle and spin rate which results in greater roll. Further, the Unique golf ball is spinning less than a conventional ball and this causes the Unique ball to fly at a lower trajectory. Accordingly, the Unique ball is very efficient in terms of energy transfer, that is, a lower coefficient of restitution, and should travel further than a conventional 2 or 3 piece ball when hit under comparable circumstances.

It is believed that the Unique golf ball's improved performance may also be derived, at least in part, from the decreased moment of inertia which results from the novel construction of the balls. Moment of inertia is measured in ounce inch squared. Limited testing has shown that Unique balls, fabricated in accordance with the principles of the present invention, have a moment of inertia of about 0.240 ounce inch. In contrast, the moment of inertia of conventional golf balls varies from about 0.400 to about 0.445 ounce inch squared.

Based on tests conducted so far, the Unique golf ball of the present invention also shows a much greater gain in distance as the club head speed decreases and as the loft of the club head increases as compared with conventional TOP FLITE brand golf balls or conventional 3 piece balls. This leads to the belief that the Unique golf balls will be more playable and provide "longer" distances for all golfers including the average golfers.

Terms Utilized and Other Features

For purposes herein, when the terms "densities" and "specific gravities" are referred to, they are referred to in "apparent densities" and "apparent specific gravities." Some of the cover stocks of this invention are nonuniform in that they may incorporate skins and variable cell structures. These latter terms take into consideration these variables and give the actual density and specific gravity of the average structure. The terms "apparent dens ities" and "apparent specific gravities" also apply to the "density" and "specific gravity" of the liquid materials injected into the shell to form the core.

The term "coefficient of restitution" of a golf ball is directly related to the resiliency of the ball and how far it will travel when struck by a golf club, all other variables being constant. This coefficient is generally measured by propelling a finished golf ball against a hard surface at a fixed velocity. After the ball has rebounded from the surface its velocity is again measured. The ratio of the rebound velocity over the approach velocity is the coefficient of restitution. The coefficient of restitution data, as specified in the examples below, was arrived at by firing balls from a pneumatic cannon at muzzle velocity of 125 feet per second against a steel plate which is positioned ten feet from the muzzle of said cannon to replicate a golf club face during a hit, and measuring both the initial velocity and return velocity of the rebounding ball.

The coefficient of restitution is important because the resiliency of a golf ball is regulated by the U.S.G.A. (United States Golf Association) via a test which is generally referred to as the Initial Velocity test. In this test, a golf ball is struck by a rotating mass having a club face. The rotating mass is traveling at a speed of approximately 143 F.P.S. (feet per second). Once struck by this club face, the velocity of the ball is measured as it passes through two light screens which are positioned forward of said club face. The maximum prescribed limit for a golf ball, which is tested in this manner, is 255 feet per second at 75 degrees Fahrenheit. This U.S.G.A. upper limit standard of 255 feet per second corresponds to an average coefficient of restitution of approximately 0.815 measured with an approach velocity of 125 feet per second.

In describing the components of the subject golf ball herein, the term "spherical" is used in conjunction with the shell (center). It is understood by those skilled in the art that when referring to golf balls and their components, the term "spherical" includes surfaces and shapes which may have minor in-substantial deviations from the perfect ideal geometric spherical shape. In addition the inclusion of dimples on the exterior surface of the shell, to effect its aerodynamic properties, does not detract from its "spherical" shape for the purposes therein or in the art. Further the internal surface of the shell as well as the core may likewise incorporate intentionally designed patterns and still be considered "spherical" within the scope of this invention.

The rotational moment of inertia of a golf ball is the resistance to change in spin of the ball and is conventionally measured using an "Inertia Dynamics Moment of Inertia Measuring Instrument".

For the Unique ball of this invention, the moment of inertia is relatively low because the liquid center of the ball does not immediately rotate when the outside of the ball begins to spin. If an increased moment of inertia is desired, this may be achieved by adding high density materials to the cover and reducing the density of the liquid core to maintain the desired ball weight.

EXAMPLES OF THE INVENTION

EXAMPLE 1

Using the procedures described above, golf balls were prepared as follows:

Formulation 514-92-1 was injection molded into half shells, approximately 1.68 inches in diameter and 0.190 inches thick. Formulation 514-92-1 is as follows:

| | Parts by Weight |
|---|---|
| Surlyn 1605/8940 | 50 |
| ("SURLYN" is a trademark of | |
| E. I. DuPont De Nemours | |
| & Company of Wilmington, DE) | |
| Surlyn 1706/9910 | 50 |
| Unitane 0-110 Titanium Dioxide | 2.35 |
| ("Unitane" 0-110 is a trademark | |
| of Kemira, Inc. of Savannah, GA) | |
| Uvitex OB | 0.10 |
| ("Uvitex OB" is a trademark of | |
| Ciba-Geigy of Hawthorne, New York) | |
| Ultramarine Blue | 0.024 |
| ("Ultramarine Blue" is manufactured by | |
| Whittaker-Clark and Daniels of South | |
| Plainfield, New Jersey) | |
| Total | 102.474 |

The pole height was greater than the equator radius by 0.007 inches to allow for material flow during spin welding of the two half shells to form the hollow spheres. The two half shells had a tongue and groove configuration. The two half shells were spin bonded together to produce a hollow sphere at 4100 revolutions per minute (rpm) and 15 second dwell. The grooved half shell had a molded tapered hole 0.0125 inches in diameter at the exterior ball surface and 0.0625 inches in diameter at the interior ball surface.

Specific gravity of the cover material can range from 0.95 to 1.25. The preferred range is 0.97 to 1.0.

The flex modulus expressed in psi at 73 degrees Fahrenheit has a range of 30,000 to 60,000. The preferred range is 45,000 to 60,000. Flex modulus are measured in accordance with A.S.T.M. Test D 790.

Samples to date using ionomer compounds as listed below have the following average data:

| Specific gravity: | .97 |
|---|---|
| Actual flex modules: | 50,000 |
| Cover weight: | 21 grams |

Estimated volume of cover is 0.979 cubic inches, or 16.04 cubic centimeters.

Liquid core material, Formulation A, was introduced using a hypodermic syringe to completely fill the interior void. Formulation A is:

| Formulation A | Parts by Weight |
|---|---|
| Calcium Chloride | 45 |
| Water | 55 |
| Total | 100 |

Figure 15:
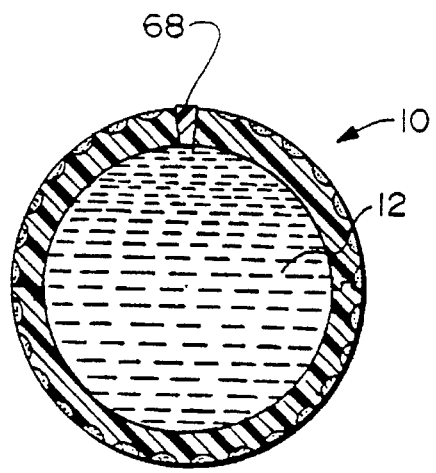

A molded plug in the shape as shown in FIGS. 12 and 15 of the same material as the shell was spin bonded into the hole to seal the contents. Spin bonding conditions were 3150 rpm and 15 seconds dwell.

The resulting product after deflashing had the following average properties:

| | |
|---|---|
| Average Diameter: | 1.694 inches |
| Average Weight: | 45.9 grams |
| Average PGA Compression: | 104 |
| Average Coefficient of Restitution: | 0.747 |

These results are the average of the three highest coefficient balls from six (6) balls produced.

The test as described above was repeated. Only 12 balls were manufactured.

| | |
|---|---|
| Average Diameter: | 1.685 inches |
| Average Weight: | 45.4 grams |
| Average PGA Compression: | 99 |
| Average Coefficient of Restitution: | 0.725 |

EXAMPLE 2

The procedure of Example 1 was followed, except that the filing material was glycerine.

The resulting product after deflashing had the following properties:

| | |
|---|---|
| Average Diameter: | 1.693 inches |
| Average Weight: | 44.4 grams |
| Average PGA Compression: | 107 |
| Average Coefficient of Restitution: | 0.758 |

These results are the average of the three longest coefficient balls of four balls produced.

As is described in Example 1 above, 12 additional balls were manufactured.

| | |
|---|---|
| Average Diameter: | 1.686 inches |
| Average Weight: | 43.8 grams |
| Average PGA Compression: | 99 |
| Average Coefficient of Restitution: | 0.732 |

EXAMPLE 3

The procedure of Example 1 was followed, except that the filling material was hydraulic oil, "Mobil Etna 26" which is a trademark of Mobile Oil Corp. of New York City, N.Y.

The resulting product after deflashing had the following properties:

| | |
|---|---|
| Average Diameter: | 1.693 inches |
| Average Weight: | 37.5 grams |
| Average PGA Compression: | 108 |
| Average Coefficient of Restitution: | 0.749 |

These results are the average of the three highest coefficient balls of four balls produced.

As is described in Example 1 above, the tests of Example 3 were repeated and 12 balls manufactured. The resulting products after deflashing had the following properties:

| | |
|---|---|
| Average Diameter: | 1.683 inches |
| Average Weight: | 37.1 grams |
| Average PGA Compression: | 99 |
| Average Coefficient of Restitution: | 0.745 |

EXAMPLE 4

The procedure of Example 1 was followed, except that the filling material was gelatin/sugar/water solution, Formulation B. Formulation B is as follows:

| Formulation B | Parts by Weight |
|---|---|
| Gelatin ("Royal" Gelatin Dessert, manufactured by Nabisco Brands, Inc. of East Hanover N.J. 07936) | 45 |
| Sugar | 80 |
| Water | 240 |
| Total | 365 | introduced at one hundred fifty (150) degrees Fahrenheit. On cooling, a solid gel is produced.

The resulting product after deflashing had the following properties:

| | |
|---|---|
| Average Diameter: | 1.687 inches |
| Average Weight: | 42.7 grams |
| Average PGA Compression: | 106 |
| Average Coefficient of Restitution: | 0.749 |

These results are the average of the three highest coefficient balls of four balls produced.

As is described above relative to Example 1, the tests were repeated and 12 balls were manufactured. The resulting products after flashing had the following properties:

| | |
|---|---|
| Average Diameter: | 1.684 inches |
| Average Weight: | 42 grams |
| Average PGA Compression | 98 |
| Average Coefficient of Restitution: | 0.733 |

EXAMPLE 5

The procedure of Example 1 was followed, except that the shell material was 514-93-3, as follows:

| | Parts by Weight |
|---|---|
| Escor 900 ("Escor" is a Trademark of Exxon Chemical of Houston, Texas) | 50 |
| Escor 4000 | 50 |
| Uritane 0-110 Titanium Dioxide | 2.35 |
| Uvitex OB | 0.10 |
| Ultramarine Blue | 0.024 |

-continued

| | Parts by Weight |
|---|---|
| Total | 102.474 |

The resulting product after deflashing had the following properties:

| | |
|---|---|
| Average Diameter: | 1.693 inches |
| Average Weight: | 45.9 grams |
| Average PGA Compression: | 104 |
| Average Coefficient of Restitution: | 0.747 |

These results are the average of the three highest coefficient balls of four balls produced.

As is described above in Example 1, the tests of Example 1 were repeated and 12 golf balls formed. The resulting products after deflashing had the following physical properties:

| | |
|---|---|
| Average Diameter: | 1.687 inches |
| Average Weight: | 45.4 grams |
| Average PGA Compression: | 104 |
| Average Coefficient of Restitution: | 0.738 |

The present disclosure includes that contained in the appended claims as well as that of the foregoing description. Although this invention has been described in its preferred embodiments, it is understood that the present disclosure of the preferred embodiments have been made only by way of example and numerous changes in the details of construction and combination and arrangement of parts may be resorted to without departing from the spirit and scope of the invention as described in the following claims.

Now that the invention has been described, we claim:

1. An improved golf ball comprising:

a hollow, spherical shell of a deformable polymeric material and a unitary core of a material which, at the time of introduction into the shell, is a liquid or can be handled as a liquid and which forms a substantially homogeneous core that substantially fills the hollow spherical shell without stressing the spherical shell;

the structural characteristics of the spherical shell and the core being such that the improved golf ball has a high coefficient of restitution, so that when the improved golf ball is struck by a golf club, the improved golf ball has an initial velocity which approaches the maximum allowable limits imposed by the U.S.G.A. and so that when the improved golf ball is struck by the golf club, the improved golf ball may be driven at long distances in regulation play.

2. A golf ball comprising:

a hollow, spherical shell formed of hemispheres spin welded together adjacent to its equator with an interface in a tongue and groove configuration, the shell being formed of a deformable polymeric material with a thickness of about 0.090 inches;

a non-cellular, unitary, substantially homogenous core of a core material which at the time of its introduction into the shell, is a liquid or can be handled as a liquid; and a plug filling a hole in the shell through which the core material was introduced; the structural characteristics of the shell and core material being such that the golf ball has a high co-efficient of restitution and conforms to the initial velocity requirements of the U.S.G.A. and such that the golf ball may be driven long distances in regulation play.

3. An improved golf ball that has a high coefficient of restitution, that conforms to the initial velocity requirements of the U.S.G.A., and that may, in regulation play, be driven long distances, in terms of both carry and roll, as a result of being struck by a golf club, the improved golf ball comprising: a substantially spherical shell of polymeric material and a core material that substantially fills the spherical shell without stressing the spherical shell, where the spherical shell is substantially solely responsible for the initial velocity of the golf ball when the golf ball is struck by the golf club and which allows the golf ball to be driven long distances both in the air and on the ground when it lands.

4. The golf ball of claim 3 wherein the core material contributes to the overall weight of the golf ball but contributes substantially nothing to the initial velocity or the coefficient of restitution of the improved golf ball when the improved golf ball is struck by the golf club.

5. The golf ball of claim 4 wherein the core material is a liquid or can be handled as a liquid when introduced into the shell; and wherein the shell is made from a deformable polymeric material.

6. The golf ball of claim 5 wherein the shell is blow molded prior to the introduction of the core material within the shell.

7. The golf ball of claim 6 wherein the external surface of the shell has dimples formed therein during the blow molding of the shell.

8. The golf ball of claim 6 wherein a second layer of polymeric material is formed about the external surface of the shell; and wherein the external surface of the second layer has dimples formed therein.

9. The golf ball of claim 1, 3, 4, or 5 wherein the shell material has a thickness of between about 0.060 inches and about 0.410 inches.

10. The golf ball of claim 1, 3, 4, or 5 wherein the shell material has a thickness of between about 0.075 inches and about 0.300.

11. The golf ball of claim 1, 3, 4 or 5 wherein the shell material has a thickness of between about 0.090 inches and about 0.190 inches.

12. The golf ball of claim 1, 3, 4 or 5 wherein the shell is formed from a polymeric material selected from the group consisting of polyurethane resins, polyolefin resins, ionic copolymers which are metal salts of the reaction product of an olefin having from 3 to 8 carbon atoms and an unsaturated monocarboxylic acid having from 2 to 8 carbon atoms and mixtures of said polymers.

13. The golf ball of claim 1, 3, 4 or 5 wherein the shell is formed from a member selected from the group consisting of ionic copolymers which are the sodium salt of the reaction product of an olefin having from 2 to 8 carbon atoms and an unsaturated monocarboxylic acid having from 3 to 8 carbon atoms and the zinc salt of the reaction product of an olefin having from 2 to 8 carbon atoms and an unsaturated monocarboxylic acid having from 3 to 8 carbon atoms.

14. The golf ball of claim 1, 3, 4 or 5 wherein the shell is formed from a mixture of ionic copolymers selected from the group consisting of ionic copolymers which are the sodium salt of the reaction product of an olefin having from 2 to 8 carbon atoms and an unsaturated monocarboxylic acid having from 3 to 8 carbon atoms and the zinc salt of the reaction product of an olefin having from 2 to 8 carbon atoms and an unsaturated monocarboxylic acid having from 3 to 8 carbon atoms.

15. The golf ball of claim 1, 3, 4, or 5 wherein the spherical shell is filled with a material which is a member selected from a group consisting of a liquid, a gel or a melt.

16. The golf ball of claim 1, 3, 4, or 5 wherein the spherical shell is filled with a material which is a member selected from a group consisting of a liquid, a gel or a melt; and wherein the polymeric material of the shell is cellular.

17. The golf ball of claim 1, 3, 4, or 5 wherein the spherical shell is filled with a material which is a member selected from a group consisting of a liquid, a gel or a melt; and wherein the spherical shell is made of more than one layer of polymeric material.

\* \* \* \* \*